(12) United States Patent
Balutis et al.

(10) Patent No.: US 10,274,954 B2
(45) Date of Patent: Apr. 30, 2019

(54) ROBOT LAWNMOWER MAPPING

(71) Applicant: iRobot Corporation, Bedford, MA (US)

(72) Inventors: Paul C. Balutis, Shrewsbury, MA (US); Andrew Beaulieu, Watertown, MA (US); Brian Yamauchi, Boston, MA (US); Karl Jeffrey Karlson, Framingham, MA (US); Dominic Hugh Jones, Boston, MA (US)

(73) Assignee: iRobot Corporation, Bedford, MA (US)

( * ) Notice: Subject to any disclaimer, the term of this patent is extended or adjusted under 35 U.S.C. 154(b) by 81 days.

(21) Appl. No.: 15/229,674

(22) Filed: Aug. 5, 2016

(65) Prior Publication Data

US 2016/0363933 A1 Dec. 15, 2016

Related U.S. Application Data

(63) Continuation of application No. 14/570,616, filed on Dec. 15, 2014, now Pat. No. 9,420,741.

(51) Int. Cl.
*G05D 1/00* (2006.01)
*A01D 34/00* (2006.01)
(Continued)

(52) U.S. Cl.
CPC ......... *G05D 1/0044* (2013.01); *A01D 34/008* (2013.01); *G01S 19/13* (2013.01);
(Continued)

(58) Field of Classification Search
CPC .. G05D 1/0044; G05D 1/0088; G05D 1/0214; G05D 1/0221; G05D 1/0265;
(Continued)

(56) References Cited

U.S. PATENT DOCUMENTS 2,751,030 A 6/1956 Null
3,128,840 A 4/1964 Barrett
(Continued)

FOREIGN PATENT DOCUMENTS

DE 19932552 2/2000
EP 0774702 5/1997
(Continued)

OTHER PUBLICATIONS

Kimura et al., "Stuck Evasion Control for Active Wheel Passive-Joint Snake-like Mobile Robot 'Genbu'." Proceedings of the 2004 IEEE International Conference on Robotics 8 Automation New Orleans, LA Apr. 2004.

(Continued)

*Primary Examiner* — Nga X Nguyen

(74) *Attorney, Agent, or Firm* — Fish & Richardson P.C.

(57) ABSTRACT

A method of mapping an area to be mowed with an autonomous mowing robot comprises receiving mapping data from a robot lawnmower, the mapping data specifying an area to be mowed and a plurality of locations of beacons positioned within the area to be mowed, and receiving at least first and second geographic coordinates for first and second reference points that are within the area and are specified in the mapping data. The mapping data is aligned to a coordinate system of a map image of the area using the first and second geographic coordinates. The map image is displayed based on aligning the mapping data to the coordinate system.

23 Claims, 18 Drawing Sheets

(51) Int. Cl.
*G01S 19/13* (2010.01)
*G05D 1/02* (2006.01)
*A01D 101/00* (2006.01)

(52) U.S. Cl.
CPC ........... *G05D 1/0088* (2013.01); *G05D 1/021* (2013.01); *G05D 1/028* (2013.01); *G05D 1/0214* (2013.01); *G05D 1/0219* (2013.01); *G05D 1/0221* (2013.01); *G05D 1/0231* (2013.01); *G05D 1/0234* (2013.01); *G05D 1/0236* (2013.01); *G05D 1/0265* (2013.01); *G05D 1/0274* (2013.01); *G05D 1/0278* (2013.01); *A01D 2101/00* (2013.01); *G05D 2201/0208* (2013.01); *Y10S 901/01* (2013.01)

(58) Field of Classification Search
CPC .. G05D 1/0274; G05D 1/0219; G05D 1/0231; G05D 1/028; G05D 2201/0208; G05D 1/0278; G05D 1/021; G05D 1/0236; G05D 1/0234; G01S 19/13; A01D 34/008; A01D 2101/00; Y10S 901/01
USPC ................. 700/253, 245, 247, 258
See application file for complete search history.

(56) References Cited

U.S. PATENT DOCUMENTS

| | | |
|---|---|---|
| 3,385,041 A | 5/1968 | Douglas |
| 3,457,575 A | 7/1969 | Bienek |
| 3,550,714 A | 12/1970 | Bellinger |
| 3,674,316 A | 7/1972 | De Brey |
| 3,924,389 A | 12/1975 | Kita |
| 3,937,174 A | 2/1976 | Haaga |
| 3,946,543 A | 3/1976 | Templeton |
| 4,119,900 A | 10/1978 | Kremnitz |
| 4,133,404 A | 1/1979 | Griffin |
| 4,163,977 A | 8/1979 | Polstorff |
| 4,306,329 A | 12/1981 | Yokoi |
| 4,318,266 A | 3/1982 | Taube |
| 4,369,543 A | 1/1983 | Chen et al. |
| 4,513,469 A | 4/1985 | Godfrey et al. |
| 4,545,404 A | 10/1985 | Yoshimura et al. |
| 4,545,453 A | 10/1985 | Yoshimura et al. |
| 4,556,313 A | 12/1985 | Miller et al. |
| 4,603,753 A | 8/1986 | Yoshimura et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| 4,700,301 A | 10/1987 | Dyke |
| 4,700,427 A | 10/1987 | Knepper |
| 4,716,621 A | 1/1988 | Zoni |
| 4,733,431 A | 3/1988 | Martin |
| 4,756,049 A | 7/1988 | Uehara |
| 4,767,237 A | 8/1988 | Cosman et al. |
| 4,777,416 A | 10/1988 | George, II et al. |
| 4,782,550 A | 11/1988 | Jacobs |
| 4,811,228 A | 3/1989 | Hyyppa et al. |
| 4,854,000 A | 8/1989 | Takimoto |
| 4,887,415 A | 12/1989 | Martin |
| 4,893,025 A | 1/1990 | Lee |
| 4,909,024 A | 3/1990 | Jones et al. |
| 4,912,643 A | 3/1990 | Beirne |
| 4,918,441 A | 4/1990 | Bohman |
| 4,919,224 A | 4/1990 | Shyu et al. |
| 4,933,864 A | 6/1990 | Evans et al. |
| 4,962,453 A | 10/1990 | Pong et al. |
| 4,974,283 A | 12/1990 | Holsten et al. |
| 5,002,145 A | 3/1991 | Waqkaumi et al. |
| 5,017,415 A | 5/1991 | Cosman et al. |
| 5,086,535 A | 2/1992 | Grossmeyer et al. |
| 5,093,955 A | 3/1992 | Blehert et al. |
| 5,109,566 A | 5/1992 | Kobayashi et al. |
| 5,142,985 A | 9/1992 | Stearns et al. |
| 5,163,202 A | 11/1992 | Kawakami et al. |
| 5,163,273 A | 11/1992 | Wojtkowski et al. |
| 5,165,064 A | 11/1992 | Mattaboni |
| 5,204,814 A | 4/1993 | Noonan et al. |
| 5,208,521 A | 5/1993 | Aoyama |
| 5,216,777 A | 6/1993 | Moro et al. |
| 5,239,720 A | 8/1993 | Wood et al. |
| 5,261,139 A | 11/1993 | Lewis |
| 5,279,672 A | 1/1994 | Betker et al. |
| 5,284,522 A | 2/1994 | Kobayashi et al. |
| 5,293,955 A | 3/1994 | Lee |
| 5,303,448 A | 4/1994 | Hennessey et al. |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,438,721 A | 8/1995 | Pahno et al. |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,483,346 A | 1/1996 | Butzer |
| 5,497,529 A | 3/1996 | Boesi |
| 5,507,067 A | 4/1996 | Hoekstra et al. |
| 5,515,572 A | 5/1996 | Hoekstra et al. |
| 5,528,888 A | 6/1996 | Miyamoto et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,709,007 A | 1/1998 | Chiang |
| 5,761,762 A | 6/1998 | Kubo et al. |
| 5,781,960 A | 7/1998 | Kilstrom et al. |
| 5,787,545 A | 8/1998 | Co lens |
| 5,794,297 A | 8/1998 | Muta |
| 5,812,267 A | 9/1998 | Everett, Jr. et al. |
| 5,819,008 A | 10/1998 | Asama et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,916,111 A | 6/1999 | Colens |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,959,423 A | 9/1999 | Nakanishi et al. |
| 5,974,348 A | 10/1999 | Rocks |
| 6,009,358 A | 12/1999 | Angott et al. |
| 6,041,471 A | 3/2000 | Charkey et al. |
| 6,049,745 A | 4/2000 | Douglas et al. |
| 6,073,427 A | 6/2000 | Nichols |
| 6,076,025 A | 6/2000 | Ueno et al. |
| 6,076,227 A | 6/2000 | Schalig et al. |

(56) References Cited

U.S. PATENT DOCUMENTS

| | | |
|---|---|---|
| 6,108,076 A | 8/2000 | Hanseder |
| 6,112,143 A | 8/2000 | Allen et al. |
| 6,124,694 A | 9/2000 | Bancroft et al. |
| 6,133,730 A | 10/2000 | Winn |
| 6,140,146 A | 10/2000 | Brady et al. |
| 6,140,231 A | 10/2000 | Brady et al. |
| 6,166,706 A | 12/2000 | Gallagher et al. |
| 6,226,830 B1 | 5/2001 | Hendriks et al. |
| 6,240,342 B1 | 5/2001 | Fiegert et al. |
| 6,255,793 B1 | 7/2001 | Peless |
| 6,259,979 B1 | 7/2001 | Holmquist |
| 6,285,930 B1 | 9/2001 | Dickson et al. |
| 6,300,737 B1 | 10/2001 | Begvall et al. |
| D451,931 S | 12/2001 | Abramson et al. |
| 6,339,735 B1 | 1/2002 | Peless et al. |
| 6,374,155 B1 | 4/2002 | Wallach et al. |
| 6,385,515 B1 | 5/2002 | Dickson et al. |
| 6,408,226 B1 | 6/2002 | Byrne et al. |
| 6,417,641 B2 | 7/2002 | Peless et al. |
| 6,438,456 B1 | 8/2002 | Feddema et al. |
| 6,442,476 B1 | 8/2002 | Poropat |
| 6,443,509 B1 | 9/2002 | Levin et al. |
| 6,444,003 B1 | 9/2002 | Sutcliffe |
| 6,463,368 B1 | 10/2002 | Feiten et al. |
| 6,465,982 B1 | 10/2002 | Bergvall et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,507,773 B2 | 1/2003 | Parker et al. |
| 6,525,509 B1 | 2/2003 | Petersson et al. |
| 6,532,404 B2 | 3/2003 | Co lens |
| 6,535,793 B2 | 3/2003 | Allard |
| 6,548,982 B1 | 4/2003 | Papanikolopoulos et al. |
| 6,571,415 B2 | 6/2003 | Gerber et al. |
| 6,574,536 B1 | 6/2003 | Kawagoe et al. |
| 6,580,246 B2 | 6/2003 | Jacobs |
| 6,580,978 B1 | 6/2003 | McTamaney |
| 6,584,376 B1 | 6/2003 | Van Kommer |
| 6,586,908 B2 | 7/2003 | Petersson et al. |
| 6,594,844 B2 | 7/2003 | Jones |
| 6,604,022 B2 | 8/2003 | Parker |
| 6,605,156 B1 | 8/2003 | Clark et al. |
| 6,611,120 B2 | 8/2003 | Song et al. |
| 6,611,734 B2 | 8/2003 | Parker et al. |
| 6,611,738 B2 | 8/2003 | Raffner |
| 6,615,108 B1 | 9/2003 | Peless et al. |
| 6,658,693 B1 | 12/2003 | Reed, Jr. |
| 6,661,239 B1 | 12/2003 | Ozik |
| 6,671,592 B1 | 12/2003 | Bisset et al. |
| 6,690,134 B1 | 2/2004 | Jones et al. |
| 6,741,054 B2 | 5/2004 | Koselka et al. |
| 6,748,297 B2 | 6/2004 | Song et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,830,120 B1 | 12/2004 | Yashima et al. |
| 6,841,963 B2 | 1/2005 | Song et al. |
| 6,845,297 B2 | 1/2005 | Allard |
| 6,850,024 B2 | 2/2005 | Peless et al. |
| 6,870,792 B2 | 3/2005 | Chiappetta |
| 6,883,201 B2 | 4/2005 | Jones et al. |
| 6,885,912 B2 | 4/2005 | Peless et al. |
| 6,901,624 B2 | 6/2005 | Mori et al. |
| D510,066 S | 9/2005 | Hickey et al. |
| 6,938,298 B2 | 9/2005 | Aasen |
| 6,940,291 B1 | 9/2005 | Ozik |
| 6,956,348 B2 | 10/2005 | Landry et al. |
| 6,971,140 B2 | 12/2005 | Kim |
| 6,984,952 B2 | 1/2006 | Peless et al. |
| 6,999,850 B2 | 2/2006 | McDonald |
| 7,024,278 B2 | 4/2006 | Chiapetta et al. |
| 7,069,124 B1 | 6/2006 | Whittaker et al. |
| 7,076,348 B2 | 7/2006 | Bucher et al. |
| 7,085,624 B2 | 8/2006 | Aldred et al. |
| 7,155,309 B2 | 12/2006 | Peless et al. |
| 7,203,576 B1 | 4/2007 | Wilson et al. |
| 7,206,677 B2 | 4/2007 | Hulden |
| D559,867 S | 1/2008 | Abramson |
| 7,349,759 B2 | 3/2008 | Peless et al. |
| D573,610 S | 7/2008 | Abramson |
| 7,441,392 B2 | 10/2008 | Lilliestielke et al. |
| 7,481,036 B2 | 1/2009 | Lilliestielke et al. |
| 7,525,287 B2 | 4/2009 | Miyashita et al. |
| 7,729,801 B2 | 6/2010 | Abramson |
| 8,046,103 B2 | 10/2011 | Abramson et al. |
| 8,069,639 B2 | 12/2011 | Fancher, III |
| D652,431 S | 1/2012 | Naslund |
| D656,163 S | 3/2012 | Johansson et al. |
| 8,136,333 B1 | 3/2012 | Levin et al. |
| 8,306,659 B2 | 11/2012 | Abramson et al. |
| 8,413,616 B2 | 4/2013 | Bergquist |
| 8,532,822 B2 | 9/2013 | Abramson et al. |
| 8,634,960 B2 | 1/2014 | Sandin et al. |
| 8,635,841 B2 | 1/2014 | Fiser et al. |
| 8,781,627 B2 | 7/2014 | Sandin et al. |
| 8,868,237 B2 | 10/2014 | Sandin et al. |
| 8,924,144 B2 | 12/2014 | Forstall |
| 8,954,193 B2 | 2/2015 | Sandin et al. |
| 8,996,171 B2 | 3/2015 | Anderson |
| 9,002,535 B2 | 4/2015 | Powers et al. |
| 9,043,952 B2 | 6/2015 | Sandin et al. |
| 9,043,953 B2 | 6/2015 | Sandin et al. |
| 9,788,481 B2 * | 10/2017 | Das .......... A01D 34/008 |
| 2001/0022506 A1 | 9/2001 | Peless et al. |
| 2001/0047231 A1 | 11/2001 | Peless et al. |
| 2002/0011813 A1 | 1/2002 | Koselka et al. |
| 2002/0016649 A1 | 2/2002 | Jones |
| 2002/0120364 A1 | 8/2002 | Colens |
| 2002/0140393 A1 | 10/2002 | Peless et al. |
| 2002/0156556 A1 | 10/2002 | Ruffner |
| 2002/0160845 A1 | 10/2002 | Simonsen |
| 2002/0173877 A1 | 11/2002 | Zweig |
| 2003/0019071 A1 | 1/2003 | Field et al. |
| 2003/0023356 A1 | 1/2003 | Keable |
| 2003/0025472 A1 | 2/2003 | Jones et al. |
| 2003/0055337 A1 | 3/2003 | Lin |
| 2003/0060928 A1 | 3/2003 | Abramson et al. |
| 2003/0120389 A1 | 6/2003 | Abramson et al. |
| 2003/0137268 A1 | 7/2003 | Papanikolopoulos et al. |
| 2003/0144774 A1 | 7/2003 | Trissel et al. |
| 2003/0182914 A1 | 10/2003 | Shibata et al. |
| 2003/0192144 A1 | 10/2003 | Song et al. |
| 2003/0208304 A1 | 11/2003 | Peless et al. |
| 2003/0216834 A1 | 11/2003 | Allard |
| 2003/0233177 A1 | 12/2003 | Johnson et al. |
| 2003/0234325 A1 | 12/2003 | Marino et al. |
| 2004/0020000 A1 | 2/2004 | Jones |
| 2004/0030448 A1 | 2/2004 | Solomon |
| 2004/0030449 A1 | 2/2004 | Solomon |
| 2004/0030450 A1 | 2/2004 | Solomon |
| 2004/0030571 A1 | 2/2004 | Solomon |
| 2004/0031113 A1 | 2/2004 | Wosewick et al. |
| 2004/0036618 A1 | 2/2004 | Ku et al. |
| 2004/0049877 A1 | 3/2004 | Jones et al. |
| 2004/0068351 A1 | 4/2004 | Solomon |
| 2004/0068415 A1 | 4/2004 | Solomon |
| 2004/0068416 A1 | 4/2004 | Solomon |
| 2004/0076324 A1 | 4/2004 | Burl et al. |
| 2004/0088079 A1 | 5/2004 | Lavarec et al. |
| 2004/0111184 A1 | 6/2004 | Chiappetta et al. |
| 2004/0111196 A1 | 6/2004 | Dean |
| 2004/0134336 A1 | 7/2004 | Solomon |
| 2004/0134337 A1 | 7/2004 | Solomon |
| 2004/0156541 A1 | 8/2004 | Jeon et al. |
| 2004/0158357 A1 | 8/2004 | Lee et al. |
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0220000 A1 | 11/2004 | Falone et al. |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0007057 A1 | 1/2005 | Peless et al. |

(56) References Cited

U.S. PATENT DOCUMENTS

| | | | |
|---|---|---|---|
| 2005/0010331 A1 | 1/2005 | Taylor et al. | |
| 2005/0020374 A1 | 1/2005 | Wang | |
| 2005/0097952 A1 | 5/2005 | Steph | |
| 2005/0108999 A1 | 5/2005 | Bucher | |
| 2005/0113990 A1 | 5/2005 | Peless et al. | |
| 2005/0156562 A1 | 7/2005 | Cohen et al. | |
| 2005/0204717 A1 | 9/2005 | Colens | |
| 2005/0251292 A1 | 11/2005 | Casey et al. | |
| 2005/0278094 A1 | 12/2005 | Swinbanks et al. | |
| 2005/0287038 A1 | 12/2005 | Dubrovsky et al. | |
| 2006/0293794 A1 | 12/2006 | Harwig et al. | |
| 2007/0016328 A1 | 1/2007 | Ziegler et al. | |
| 2007/0142964 A1 | 6/2007 | Abramson | |
| 2007/0150109 A1 | 6/2007 | Peless et al. | |
| 2007/0188318 A1 | 8/2007 | Cole et al. | |
| 2008/0039974 A1 | 2/2008 | Sandin et al. | |
| 2008/0097645 A1 | 4/2008 | Abramson et al. | |
| 2008/0167753 A1 | 7/2008 | Peless et al. | |
| 2008/0183349 A1 | 7/2008 | Abramson et al. | |
| 2009/0254218 A1 | 10/2009 | Sandin et al. | |
| 2010/0059000 A1 | 3/2010 | Bergquist | |
| 2010/0102525 A1 | 4/2010 | Fancher | |
| 2011/0130875 A1 | 6/2011 | Abramson | |
| 2011/0234153 A1 | 9/2011 | Abramson | |
| 2012/0041594 A1 | 2/2012 | Abramson et al. | |
| 2012/0095619 A1 | 4/2012 | Pack et al. | |
| 2012/0226381 A1 | 9/2012 | Abramson et al. | |
| 2012/0265391 A1* | 10/2012 | Letsky | A01D 34/008 701/25 |
| 2012/0290165 A1 | 11/2012 | Ouyang | |
| 2013/0006419 A1 | 1/2013 | Bergstrom et al. | |
| 2013/0024025 A1* | 1/2013 | Hsu | G05D 1/0016 700/259 |
| 2013/0030609 A1 | 1/2013 | Jagenstedt | |
| 2013/0066484 A1 | 3/2013 | Markusson et al. | |
| 2013/0076304 A1 | 3/2013 | Andersson et al. | |
| 2013/0110322 A1 | 5/2013 | Jagenstedt et al. | |
| 2013/0152538 A1 | 6/2013 | Fiser et al. | |
| 2013/0184924 A1 | 7/2013 | Jagenstedt et al. | |
| 2013/0249179 A1 | 9/2013 | Burns | |
| 2013/0274920 A1 | 10/2013 | Abramson et al. | |
| 2014/0058611 A1* | 2/2014 | Borinato | G05D 1/0265 701/23 |
| 2014/0102061 A1 | 4/2014 | Sandin et al. | |
| 2014/0102062 A1 | 4/2014 | Sandin et al. | |
| 2014/0117892 A1 | 5/2014 | Coates | |
| 2014/0277900 A1 | 9/2014 | Abhyanker | |
| 2015/0006015 A1 | 1/2015 | Sandin et al. | |
| 2015/0234385 A1 | 8/2015 | Sandin et al. | |
| 2015/0253757 A1* | 9/2015 | Ikeda | G05B 19/402 700/114 |

FOREIGN PATENT DOCUMENTS

| | | |
|---|---|---|
| EP | 0792726 | 9/1997 |
| EP | 1331537 | 7/2003 |
| EP | 1704766 | 9/2006 |
| FR | 2828589 | 8/2001 |
| GB | 2142447 | 1/1985 |
| GB | 2283838 | 5/1995 |
| GB | 2382157 | 5/2003 |
| JP | 62120510 | 6/1987 |
| JP | 62154008 | 7/1987 |
| JP | 63183032 | 7/1988 |
| JP | 63241610 | 10/1988 |
| JP | 26312 | 1/1990 |
| JP | 03051023 | 3/1991 |
| JP | 04320612 | 11/1992 |
| JP | 06327598 | 11/1994 |
| JP | 07129239 | 5/1995 |
| JP | 07295636 | 11/1995 |
| JP | 0816776 | 1/1996 |
| JP | 08089451 | 4/1996 |
| JP | 08152916 | 6/1996 |
| JP | 09179625 | 7/1997 |
| JP | 9185410 | 7/1997 |
| JP | 11508810 | 8/1999 |
| JP | 11510935 | 9/1999 |
| JP | 2001258807 | 9/2001 |
| JP | 2001275908 | 10/2001 |
| JP | 2001525567 | 12/2001 |
| JP | 2002078650 | 3/2002 |
| JP | 2002204768 | 7/2002 |
| JP | 3356170 | 10/2002 |
| JP | 2002532178 | 10/2002 |
| JP | 3375843 | 11/2002 |
| JP | 2002323925 | 11/2002 |
| JP | 2002355206 | 12/2002 |
| JP | 2002360471 | 12/2002 |
| JP | 2002360482 | 12/2002 |
| JP | 2003005296 | 1/2003 |
| JP | 2003010076 | 1/2003 |
| JP | 200305296 | 2/2003 |
| JP | 2003036116 | 2/2003 |
| JP | 2003038401 | 2/2003 |
| JP | 2003038402 | 2/2003 |
| JP | 2003505127 | 2/2003 |
| JP | 2003061882 | 3/2003 |
| JP | 2003310489 | 11/2003 |
| WO | 199502220 | 1/1995 |
| WO | 199526512 | 10/1995 |
| WO | 199740734 | 11/1997 |
| WO | 199741451 | 11/1997 |
| WO | 199853456 | 11/1998 |
| WO | 199916078 | 4/1999 |
| WO | 199928800 | 6/1999 |
| WO | 199938056 | 7/1999 |
| WO | 199938237 | 7/1999 |
| WO | 199959042 | 11/1999 |
| WO | 200004430 | 1/2000 |
| WO | 200036962 | 6/2000 |
| WO | 200038026 | 6/2000 |
| WO | 200038029 | 6/2000 |
| WO | 200078410 | 12/2000 |
| WO | 200106904 | 2/2001 |
| WO | 200106905 | 2/2001 |
| WO | 200239864 | 5/2002 |
| WO | 200239868 | 5/2002 |
| WO | 2002058527 | 8/2002 |
| WO | 2002062194 | 8/2002 |
| WO | 2002067744 | 9/2002 |
| WO | 2002067745 | 9/2002 |
| WO | 2002074150 | 9/2002 |
| WO | 2002075356 | 9/2002 |
| WO | 2002075469 | 9/2002 |
| WO | 2002075470 | 9/2002 |
| WO | 2002101477 | 12/2002 |
| WO | 2003026474 | 4/2003 |
| WO | 2003040845 | 5/2003 |
| WO | 2003040846 | 5/2003 |
| WO | 200365140 | 8/2003 |
| WO | 2004004533 | 1/2004 |
| WO | 2004006034 | 1/2004 |
| WO | 2004058028 | 1/2004 |
| WO | 2005077244 | 1/2004 |
| WO | 2006068403 | 1/2004 |
| WO | 2005055795 | 6/2005 |
| WO | 2010077198 | 7/2010 |

OTHER PUBLICATIONS

Kozlowski and Pazderski. Modeling and Control of a 4-wheel Skid-steering Mobile Robot. International J. of Applied Mathematics and Computer Science, 14:477-496, 2004.

Angle et al., U.S. Appl. No. 60/177,703, 16 pages, published Feb. 7, 2002, available at http://portal.uspto.gov/external/portal/pair, accessed Jul. 11, 2012.

Bohn et al. "Super-distributed RFID Tag Infrastructures", Lecture Notes in Computer Science, Springer Verlag, Berlin, DE, vol. 3295, pp. 1-12, Nov. 11, 2004.

(56) References Cited

OTHER PUBLICATIONS

Campbell et al., U.S. Appl. No. 60/741,442, 113 pages, published Jun. 7, 2007, available at http://patentscope.wipo.int/search/docservicepdf_pct/id00000005206306.pdf, accessed Jul. 11, 2012.
Caracciolo et al. (1999): Trajectory Tracking Control of a Four-wheel Differentially Driven Mobile Robot. IEEE Int. Conf. Robotics and Automation, Detroit, MI, pp. 2632-2638.
Casey et al., U.S. Appl. No. 60/582,992, 24 pages, published Nov. 10, 2005, available at http://portal.uspto.gov/external/portal/pair, accessed Jul. 11, 2012.
Communication from a foreign patent office in counterpart application PCT/US2007/064326, dated Jul. 17, 2008.
Domnitcheva "Smart Vacuum Cleaner an Autonomous Location-Aware Cleaning Device" Proceedings of the International Conference on Ubiquitous Computing, pp. 1-2, Sep. 10, 2004.
Doty et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.
Electrolux designed for the well-lived home, website: http://www.electroluxusa.com/node57.as[?currentURL=node142.asp%3F, accessed Mar. 18, 2005.
eVac Robotic Vacuum S1727 Instruction Manual, Sharper Image Corp, Copyright 2004.
Everyday Robots, website: http://www.everydayrobots.com/index.php?option=content&task=view&id=9, accessed Apr. 20, 2005.
Facts on the Trilobite webpage: "http://trilobiteelectroluxse/presskit_en/node1335asp?print=yes&pressID=" accessed Dec. 12, 2003.
Friendly Robotics Robotic Vacuum RV400-The Robot Store website: http://www.therobotstore.com/s.n1/sc.9/category,-109/it.A/id.43/.f, accessed Apr. 20, 2005.
Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.
Hicks et al., "A Survey of Robot Lawn Mowers", http://www.robotics.uc.edu/papers/paper2000/lawnmower.pdf (8 pages).
Hitachi: News release: The home cleaning robot of the autonomous movement type (experimental machine) is developed, website: http://www.i4u.com/japanreleases/hitachirobot.htm., accessed Mar. 18, 2005.
International Preliminary Report on Patentability dated Sep. 23, 2008 from International Application No. PCT/US2007/064323.
International Preliminary Report on Patentability dated Sep. 23, 2008 from International Application No. PCT/US2007/064326.
International Search Report and Written Opinion in International Application No. PCT/US2015/050477, dated Dec. 1, 2015, 12 pages.
Kahney, "Robot Vacs are in the House," Retrieved from the Internet: URL<www.wired.com/news/technology/0.1282.59237.00.html>. 5 pages, Jun. 2003.
Karcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004.
Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.
Karcher RoboCleaner RC 3000 Product Details webpages: "http://wwwrobocleanerde/english/screen3html" through "... screen6html" accessed Dec. 12, 2003.
Karcher USA, RC3000 Robotic Cleaner, website: http://www.karcher-usa.com/showproducts.php?op=view_prod&param1=143&param2=&param3=, accessed Mar. 18, 2005.
Koolvac Robotic Vacuum Cleaner Owner's Manual, Koolatron, Undated.
Kubitz et al. "Application of radio frequency identification devices to support navigation of autonomous mobile robots," Vehicular Technology Conference, vol. 1, pp. 126-130, May 4, 1997.
Matthies et al., "Detecting Water Hazards for Autonomous Off-Road Navigation," Proceedings of SPIE Conference 5083: *Unmanned Ground Vehicle Technology V*, Orlando, FL, Apr. 2003, pp. 231-242.
Morland, "Autonomous Lawnmower Control", Downloaded from the internet at: http://cns.bu.edu/~cimorlan/robotics/lawnmower/report.pdf, 10 pages, Jul. 2002.
NorthStar Low-Cost, Indoor Localization, Evolution robotics, Powering Intelligent Products.
On Robo, "Robot Reviews Samsung Robot Vacuum (VC-RP30W)," Retrieved from the Internet: URL <www.onrobo.com/reviews/AT Home/vacuumcleaners/on00vcrb30rosam/index.htm>. 2 pages, 2005.
Partial International Search Report from counterpart application PCT/US2007/064323 dated Mar. 14, 2008.
Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005.
RoboMaid Sweeps Your Floors So You Won't Have to, the Official Site, website: http://www.thereobomaid.com/, acessed Mar. 18, 2005.
Robotic Vacuum Cleaner-Blue, website: http://www.sharperimage.com/us/en/catalog/productview.jhtml?sku=S1727BLU, accessed Mar. 18, 2005.
Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.
Thrun, *Learning Occupancy Grid Maps With Forward Sensor Models*, School of Computer Science, Carnegie Mellon University, pp. 1-28.
Wigley, M. "The Electric Lawn", in *The American Lawn*, Princeton Architectural Press new York with Canadian Centre for Architecture Montreal, pp. 155-195 (1999).
Wired News: Robot Vacs Are in the House, website: http://www.wired.com/news/print/0,1294,59237,00.html, accessed Mar. 18, 2005.
Zoombot Remote Controlled Vaccum-RV-500 New Roomba 2, website: http://cgi.ebay.com/ws/eBayISAPI.dll?ViewItem&category=43526&item=4373497618&rd=1, accessed Apr. 20, 2005.
United States Office Action issued in U.S. Appl. No. 11/688,213, dated Nov. 2, 2011, 12 pages.
United States Office Action issued in U.S. Appl. No. 11/688,213, dated Aug. 16, 2012, 14 pages.
United States Office Action issued in U.S. Appl. No. 11/688,213, dated May 22, 2013, 12 pages.
United States Office Action issued in U.S. Appl. No. 11/688,213, dated Oct. 3, 2013, 12 pages.
United States Notice of Allowance issued in U.S. Appl. No. 11/688,213, dated Jun. 18, 2014, 5 pages.
United States Notice of Allowance issued in U.S. Appl. No. 12/488,094, dated Apr. 12, 2012, 11 pages.
United States Notice of Allowance issued in U.S. Appl. No. 12/488,094, dated Aug. 24, 2012, 13 pages.
United States Notice of Allowance issued in U.S. Appl. No. 12/488,094, dated Feb. 14, 2013, 10 pages.
United States Notice of Allowance issued in U.S. Appl. No. 12/488,094, dated Jun. 19, 2013, 11 pages.
United States Notice of Allowance issued in U.S. Appl. No. 12/488,094, dated Jan. 31, 2014, 6 pages.
United States Notice of Allowance issued in U.S. Appl. No. 12/488,094, dated May 9, 2014, 6 pages.

\* cited by examiner

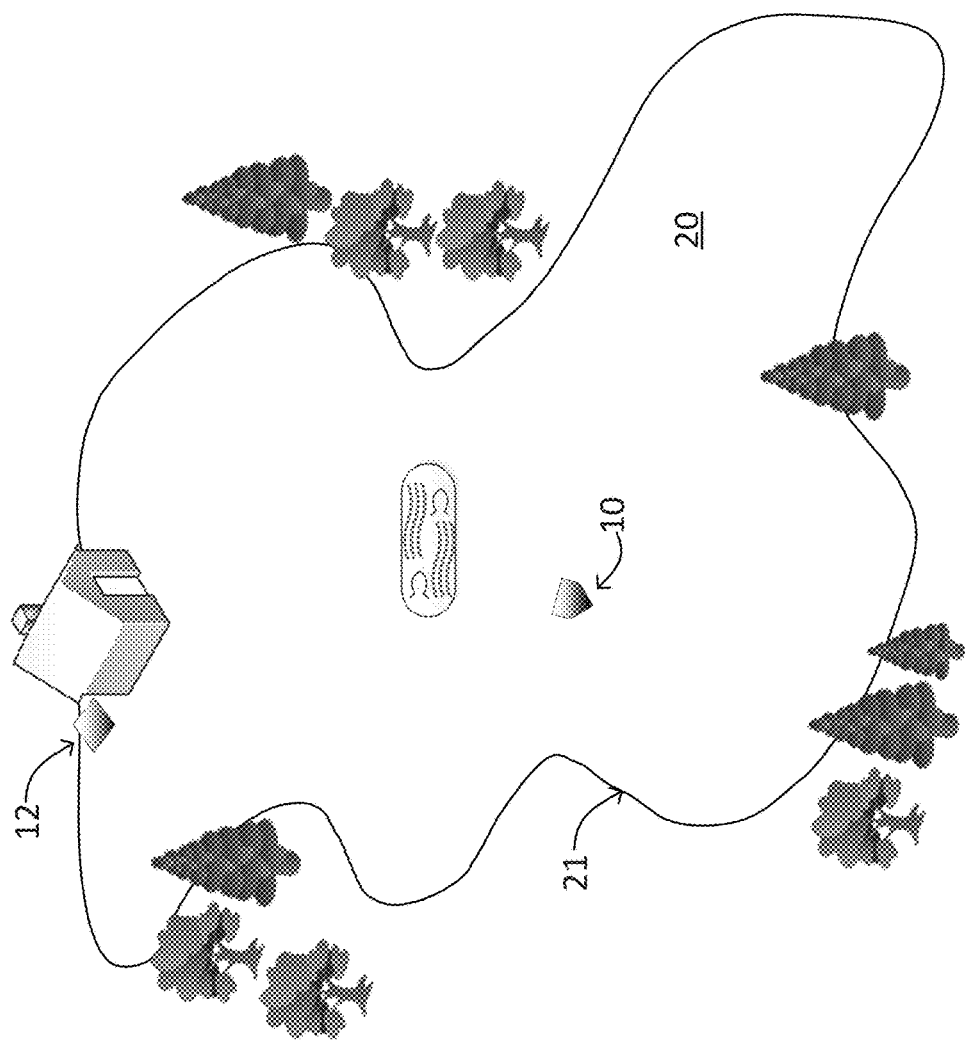

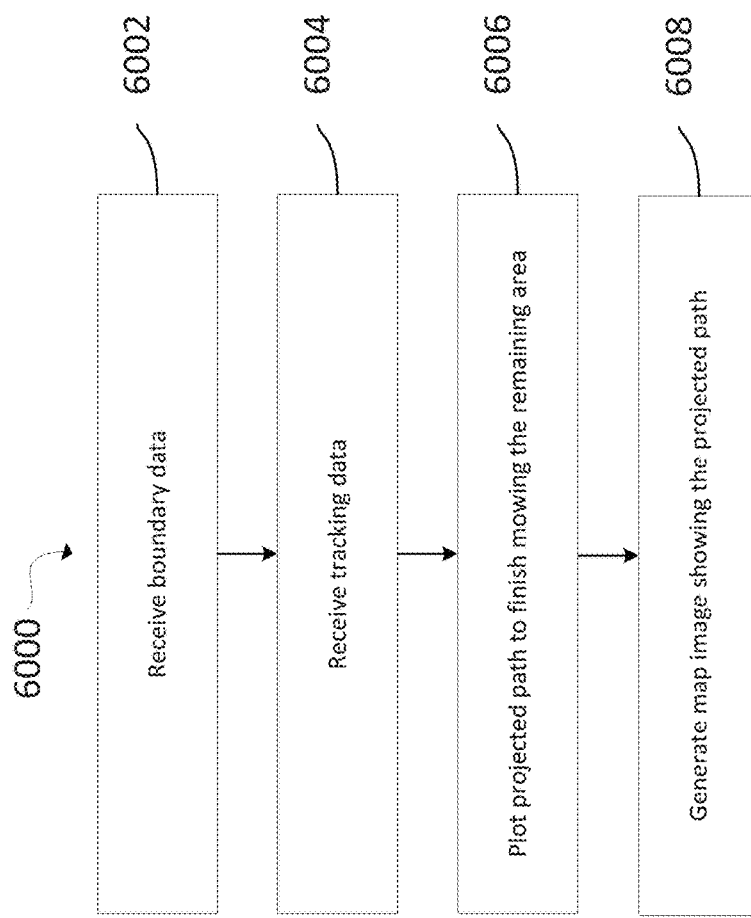

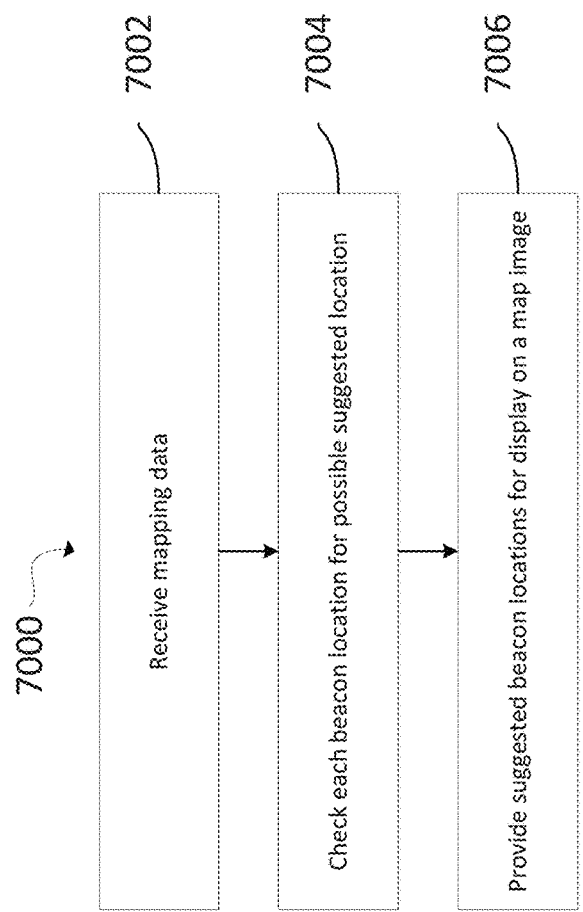

ROBOT LAWNMOWER MAPPING

CROSS-REFERENCE TO RELATED APPLICATIONS

This application is a continuation application of and claims priority to U.S. application Ser. No. 14/570,616, filed on Dec. 15, 2014, the entire contents of which are hereby incorporated by reference.

TECHNICAL FIELD

This invention relates to mapping an area to be mowed by a robot lawnmower.

BACKGROUND

Autonomous robots that perform household functions such as floor cleaning and lawn cutting are now readily available consumer products. Some robots are generally confined within (i) touched walls and other obstacles within the rooms of a dwelling, (ii) IR-detected staircases (cliffs) leading downward; and/or (iii) user-placed detectable barriers such as directed IR beams, physical barriers or magnetic tape. Walls often provide much of the confinement perimeter. Other robots may try to map the dwelling using a complex system of sensors and/or active or passive beacons (e.g., sonar, RFID or bar code detection, or various kinds of machine vision).

Some autonomous robotic lawn mowers use a continuous boundary marker (e.g., a boundary wire) for confining random motion robotic mowers. The boundary wire is intended to confine the robot within the lawn or other appropriate area, so as to avoid damaging non-grassy areas of the yard or intruding onto a neighboring property. The boundary wire is typically a continuous electrically conductive loop around the property to be mowed. Although the boundary wire can be drawn into the property in peninsulas to surround gardens or other off-limit areas, it remains a continuous loop, and is energized with an AC current detectable as a magnetic field at a distance of a few feet. The boundary wire loop must be supplied with power, usually from a wall socket. Within the bounded area, a mowing robot may "bounce" randomly as the robot nears the guide conductor, or may follow along the guide conductor. Some mowers also touch and bounce from physical barriers.

SUMMARY

In some implementations of this disclosure, a robot lawnmower system includes: a plurality of beacons positioned with respect to an area to be mowed; a robot lawnmower comprising: a detection system configured to detect the beacons; and a controller configured to, while traversing the area to be mowed, detect the beacons using the detection system and collect mapping data; one or more computer readable mediums storing instructions that, when executed by a system of one or more computing devices, cause the system to perform operations comprising: receiving the mapping data from the robot lawnmower; receiving at least first and second geographic coordinates for first and second reference points that are within the area and are specified in the mapping data; aligning the mapping data to a coordinate system of a map image of the area using the first and second geographic coordinates; and displaying the map image of the area based on aligning the mapping data to the coordinate system.

These and other implementations can optionally include the following features. The operations include receiving confirmation by a user of the area to be mowed. The operations include configuring the controller of the robot lawnmower to autonomously mow the area. The robot lawnmower comprises a global positioning system (GPS) receiver, and the controller is configured to move the robot lawnmower to the first and second reference points within the area and determine the first and second geographic coordinates for the first and reference points using the GPS receiver at the first and second reference points. The system of one or more computing devices comprises a mobile device, the mobile device comprises a global positioning system (GPS) receiver, and receiving the first and second geographic coordinates for the first and second reference points comprises: displaying instructions to a user to move the mobile device to the first reference point; in response to receiving user input indicating that the mobile device is at the first reference point, determining the first geographic coordinates using the GPS receiver; displaying instructions to the user to move the mobile device to the second reference point; and in response to receiving user input indicating that the mobile device is at the second reference point, determining the second geographic coordinates using the GPS receiver.

The system includes a docking station for the robot lawnmower at the first or second reference point. The robot lawnmower comprises a first global positioning system (GPS) receiver; the docking station comprises a second GPS receiver; receiving the first geographic coordinates comprises receiving the first geographic coordinates from the robot lawnmower using the first GPS receiver; and receiving the second geographic coordinates comprises receiving the second geographic coordinates from the docking station using the second GPS receiver. The docking station comprises a first global positioning system (GPS) receiver; the system of one or more computing devices comprises a mobile device that comprises a second GPS receiver; receiving the first geographic coordinates comprises receiving the first geographic coordinates from the docking station using the first GPS receiver; and receiving the second geographic coordinates comprises receiving the second geographic coordinates from the mobile device using the second GPS receiver. The system of one or more computing devices comprises a mobile device; receiving the mapping data from the robot lawnmower comprises receiving the mapping data over a wired or wireless communications link between the robot lawnmower and the mobile device; and aligning the mapping data to a coordinate system of the map comprises supplying the mapping data to a mapping server system of one or more computers and receiving the map image from the mapping server system.

The mapping data includes a mowing path, and wherein displaying the map image comprises displaying the map image with an overlaid visual indicator of the mowing path. Displaying the map image comprises displaying beacon indicators of locations of the beacons within the area using the mapping data. Aligning the mapping data to the coordinate system of the map image comprises one or more of: shifting, rotating, and scaling the mapping data so that first and second locations on the map of the area match the first and second reference points. The controller is configured to cause the robot lawnmower to traverse the area starting from the first or second reference point. The operations can include: supplying the mapping data and the first and second geographic coordinates for the first and second reference points to a remote server system of one or more computers;

receiving, from the remote server system, one or more suggested positions within the area for the beacons; and displaying, on the map, indicators for the suggested positions for the beacons.

The operations can include: for at least one beacon, determining first and second distances to first and second nearest neighbor beacons to the at least one beacon; determining that a difference between the first and second distances is greater than a threshold distance; determining a suggested beacon location for the at least one beacon at a mid-point between the first and second nearest neighbor beacons along a perimeter of the area to be mowed; and displaying, on the map, an indicator for the suggested beacon location of the at least one beacon. The operations can include: receiving tracking data from the robot lawnmower while the robot lawnmower is mowing the area; and displaying, on the map, a graphic overlay indicating progress of the robot lawnmower. The operations can include: projecting a path of the robot lawnmower to complete mowing the area; and displaying, on the map, a graphic overlay indicating the projected path of the robot lawnmower. The operations can include: displaying a user interface element indicating an estimated amount of time to completion. The detection system comprises an emitter/receiver configured to emit a signal, and wherein the beacons are configured to reflect an emitted signal from the detection system back onto the detection system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A-1C are block diagrams illustrating an autonomous robot lawnmower 10 that is configured to mow a lawn 20.

FIG. 6 is a flow chart of an example method 6000 for projecting the remaining path of a robot lawnmower 10.

FIG. 7 is a flow chart of an example method 7000 for determining suggested beacon locations.

Like reference symbols in the various drawings indicate like elements.

DETAILED DESCRIPTION

Figure 1B:
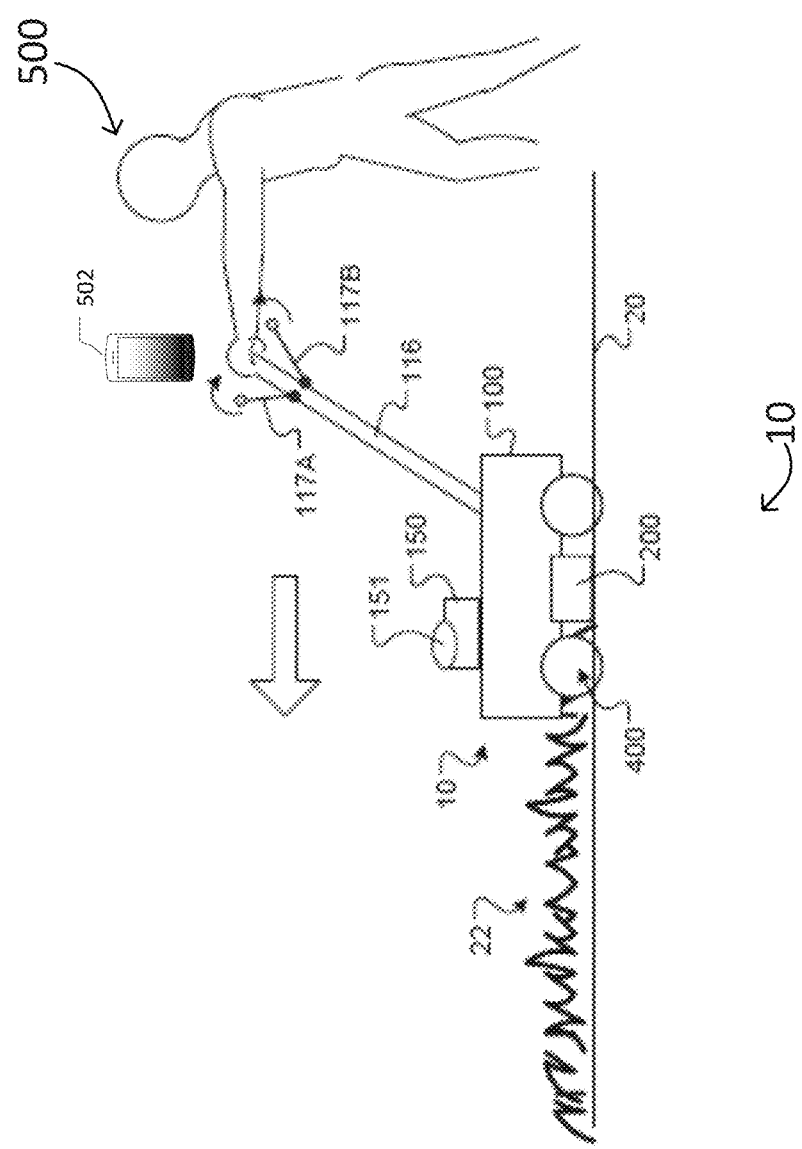
Figure 1C:
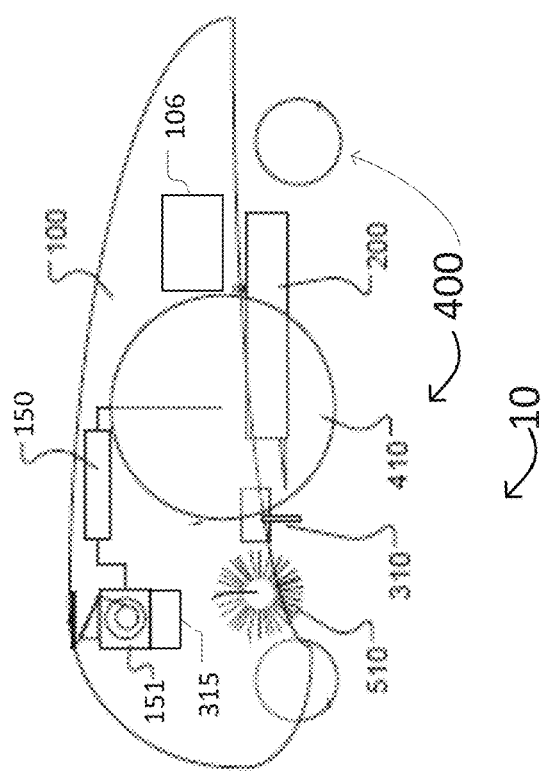

FIGS. 1A-1C are block diagrams illustrating an autonomous robot lawnmower 10 that is configured to mow a lawn 20. The autonomous robot lawnmower 10 moves about the lawn 20 and cuts grass 22 as it is traversing the lawn 20. The robot lawnmower 10 includes a body 100, a surface treater 200 secured to the body 100, a drive system 400 including at least one motorized wheel 410, and a sensor system having at least one surface sensor 310 carried by the body 100 and responsive to at least one surface characteristic. The drive system 400 is carried by the body 100. In some implementations, the drive system 400 is configured to maneuver the robot lawnmower 10 across lawn 20 while following at least one surface characteristic.

In this example, surface treater 200 includes a reciprocating symmetrical grass cutter floating on a following wheel 410. In some examples the wheel can be a continuous track, or tank tread. In other examples, surface treater 200 may comprise a rotary cutter, a spreader, or a gatherer. A grass comber 510 may also be carried by the body 100. The robot body 100 supports a power source 106 (e.g., a battery) for powering any electrical components of the robot lawnmower 10, including the drive system 400.

A computing device, e.g., a wireless operator feedback unit 502, sends a signal to an emitter/receiver 151 on the robot lawnmower 10 that is in communication with a controller 150. The wireless operator feedback unit 502 can be a mobile device comprising a processor, memory, and a digital communications system. The drive system 400 is configured to follow the signal received from the operator feedback unit 502. The robot lawnmower 10 may be docked at a base station or dock 12. In some examples, the dock 12 includes a charging system for changing the power source 106 housed by the robot body 100. In some implementations, the robot 10 includes a magnetometer 315. The magnetometer can be useful, e.g., for rotationally aligning a map of the lawn 20.

To prepare for the use of the robot lawnmower 10, a perimeter 21 of the lawn 20 to be mowed is defined. In some implementations, as a safety measure autonomous use of the robot lawnmower 10 can only be executed once a perimeter has been determined and stored in non-transitory memory of the robot lawnmower 10. In some implementations, a human operator 500 manually defines a perimeter 21 by pushing the robot 10 using a handle 116 attached to the robot body 100, as shown in FIG. 1B. In some implementations, the human operator 500 defines the perimeter 21 by controlling the robot 10 as the robot 10 moves using the drive system 400. For example, the human operator 500 can control the robot 10 using the wireless operator feedback unit 502, standing within at least a certain distance from the robot 10 for safety. Once the perimeter has been taught, the robot can navigate the lawn/area to be cut without further human intervention.

Referring to FIG. 1B, in a perimeter teaching mode, a human operator 500 manually guides the robot lawnmower 10 to establish the perimeter 21 of the lawn 20. Determining the perimeter 21 can include guiding the robot lawnmower 10 with a push bar or handle 116 attached to the body 100. The push bar 116 may be detachable from or stowable on the robot body 100. In some cases, the push bar 116 includes a switch, speed setting, or joystick to advance and steer the robot lawnmower 10. The push bar 116 can include a mechanical linkage permitting movement of a blade cowl for close edge cutting capability.

In some implementations, the push bar 116 includes one or more pressure or strain sensors, monitored by the robot lawnmower 10 to move or steer in a direction of pressure (e.g., two sensors monitoring left-right pressure or bar displacement to turn the robot lawnmower 10). In some other implementations, the push bar 116 includes a dead man or kill switch 117A in communication with the drive system 400 to turn off the robot lawnmower 10. The switch 117A may be configured as a dead man switch to turn off the robot lawnmower 10 when an operator of the push bar 116 ceases to use, or no longer maintains contact with, the push bar 116. The switch 117A may be configured act as a kill switch when the push bar 116 is stowed, allowing the robot lawnmower 10 to operate in autonomous mode. The dead man or kill switch 117A may include a capacitive sensor or a lever bar.

In some implementations, the push bar 116 includes a clutch 117B to engage/disengage the drive system 400. The robot lawnmower 10 may be capable of operating at a faster speed while manually operated by the push bar 116. For example, the robot lawnmower 10 may operate at an autonomous speed of about 0.5 m/sec and a manual speed greeter than 0.5 m/sec (including a "turbo" speed actuatable to 120-150% of normal speed). In some examples, the push bar 116 may be foldable or detachable during the robot's autonomous lawn mowing. Alternatively, the push bar 116 can be configured as one of a pull bar, pull leash, rigid handle, or foldable handle. In some embodiments, the push bar 116 can be stowed on or in the robot body 100.

As noted above, prior to autonomously mowing the lawn, the robot lawnmower 10 completes a teaching phase. During the perimeter teaching phase, the human operator 500 may pilot the robot lawnmower 10 in a manner that requires correction, thus putting the robot lawnmower 10 in an unteachable state. When the robot lawnmower 10 detects that it is in an unteachable state during a teach run, the robot lawnmower 10 alerts the operator (e.g., via operator feedback unit 502 such as a display on a mobile device or a display integrated in a handle 116) to change a direction or speed of the robot lawnmower 10 to enable the robot lawnmower 10 to continue to record the perimeter 21 and/or return to traveling on traversable terrain. For instance, the robot lawnmower 10 may enter the unteachable state when the operator pushes the robot lawnmower 10 into an area of the lawn 20 where the robot lawnmower 10 loses ability to determine its location, when the user is on a second teaching path that varies from a first teaching path, or when the user pushes the robot lawnmower 10 too fast or over terrain that is too bumpy or tilted.

For example, the human operator may try to push the robot lawnmower 10 between a divot and a rock, causing the robot lawnmower 10 to tilt at an excessive angle (e.g., over 30 degrees). Or the operator may attempt to teach the robot lawnmower 10 a path that goes through topography that the robot lawnmower 10 cannot traverse in the autonomous mode. In such cases, the robot lawnmower 10 alerts the operator (e.g., via the operator feedback unit 502) to select a different path. As previously described, the robot lawnmower 10 may alert the operator via the operator feedback unit 502 by any appropriate feedback mechanism, e.g., a visual signal on a display, an audible signal through a speaker, an olfactory feedback signal, and/or a tactile signal, such a vibration from a vibrational unit of the operator feedback unit 502.

If the human operator is pushing the robot lawnmower 10 too fast or too slow during the teaching mode, thus placing the robot in the unteachable state, the robot lawnmower 10 prompts the user to either increase or decrease the speed of the robot lawnmower 10. In some examples, operator feedback unit 502 includes a speed indicator that will light or flash (green, yellow, red light) when the robot lawnmower 10 is going at a speed greater or lower than a threshold speed.

As will be discussed below in reference to FIG. 2A, boundary markers 805 may be placed along the perimeter of the lawn 20 to aid localization of the robot lawnmower 10. In some cases, boundary markers 805 send out a signal that the robot lawnmower interprets to determine its position relative to the boundary marker. In other examples, boundary markers 805 are passive. In either case, when the robot lawnmower 10 loses contact with the boundary markers 805, the robot lawnmower 10 may alert the user, e.g., to change paths to remain within the confinement of the boundary markers 805 or to move one or more of the boundary markers 805.

In some examples, the teaching routine requires the operator to traverse the perimeter 21 of the lawn 20 a second time (or more). Once the operator completes a first teaching run, completing a closed loop about the perimeter of the area to be mowed, the robot lawnmower 10 may alert the operator that a second run is needed. In some examples, the operator hits a STOP button to affirmatively indicate completion of a teaching run around the perimeter 21 of the lawn 20. In some implementations, the teaching routine determines a taught-path grade or score, e.g., on a scale, to aid the operator in understanding how close a previous traversal of the lawn 20 was to being acceptable.

In some examples, the robot lawnmower 10 allows the operator to either complete the second teaching run right after the first teaching run or wait until later. If the operator completes a second or subsequent teaching run and the robot lawnmower detects a variance between the two determined perimeters that is greater than a threshold variance, the robot lawnmower 10 alerts the user to the apparent discrepancy and prompts another teaching run to learn the perimeter 21 of the lawn 20.

When the perimeter-teaching process is complete, the user may dock the robot lawnmower 10 in its dock 12 (see FIG. 1A), allowing the robot lawnmower 10 to recharge before mowing.

Figure 2A:
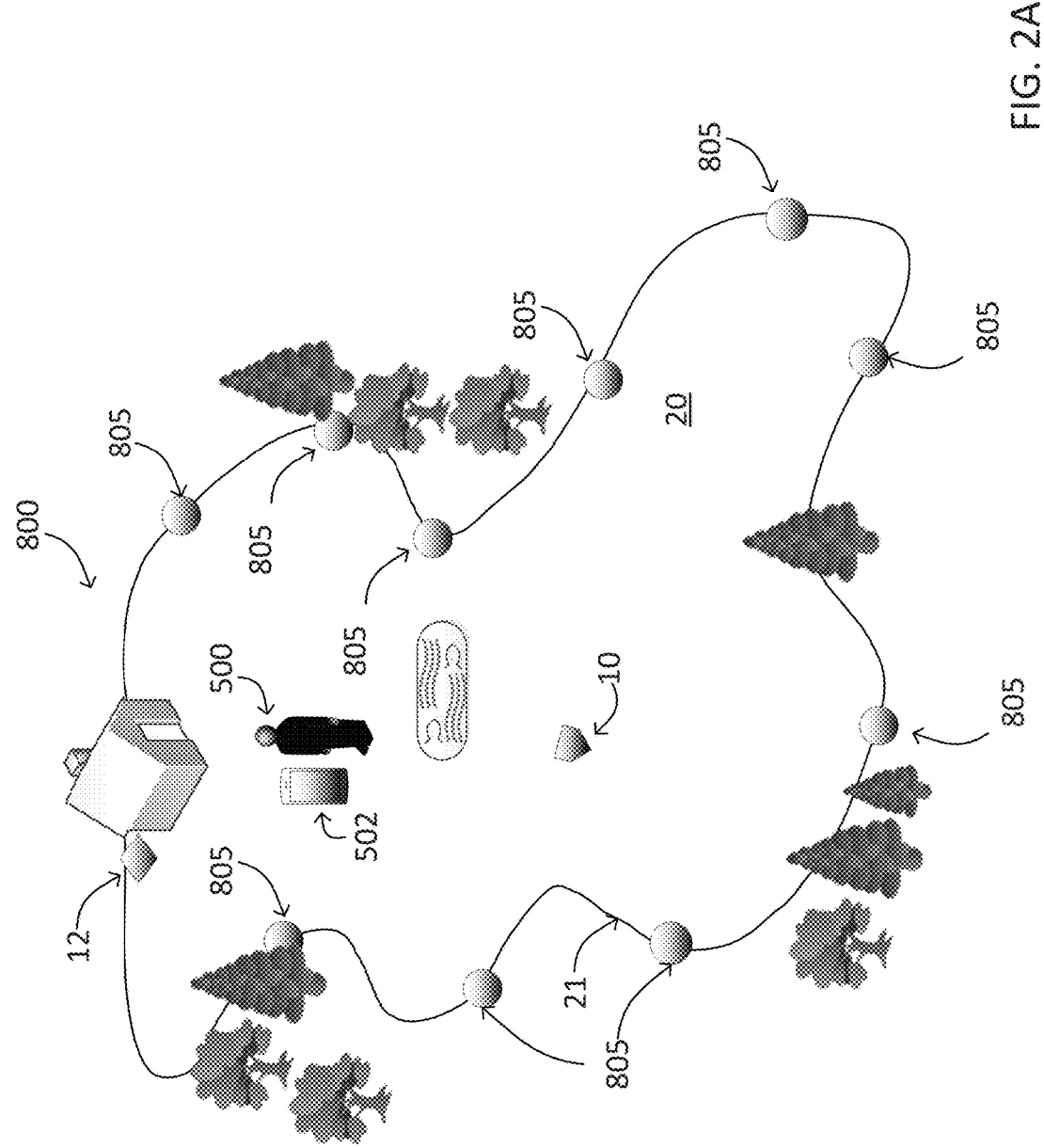
FIGS. 2A-B are block diagrams illustrating an area to be mowed having a perimeter defined by boundary markers 805.
Figure 2B:
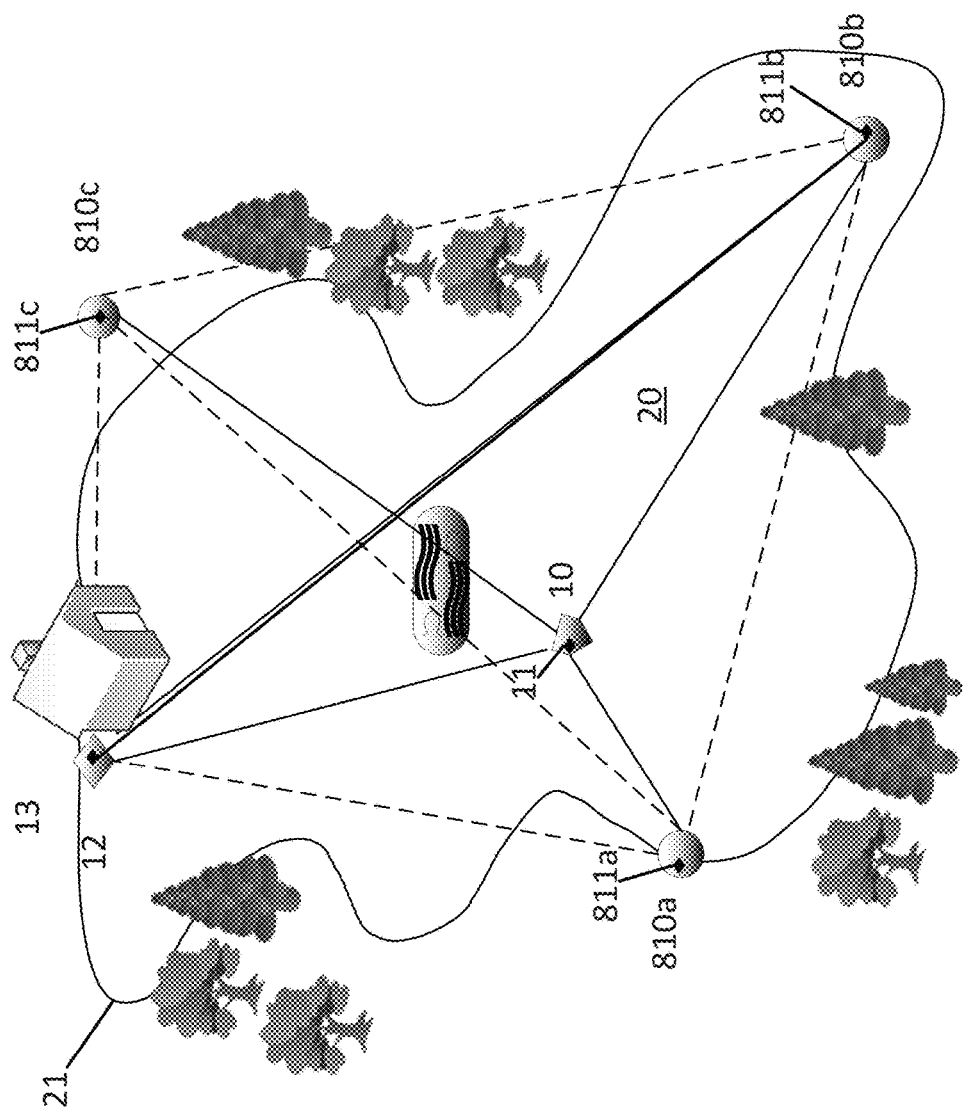

FIGS. 2A-B are block diagrams illustrating an area to be mowed having a perimeter defined by boundary markers 805. In some implementations, the robot lawnmower 10 includes a boundary detection system 800 that includes the emitter/receiver 151 disposed on the robot body 100 and boundary markers 805 (FIG. 2A). The types of passive boundary markers 805 may include: LIDAR scan match, passive LIDAR retro-reflectors (beacons) or both of those together. In some examples, the boundary markers 805 include: RADAR scan matching (blips), RADAR retro-reflectors or both. In implementations including boundary markers 805 placed along the perimeter 21 of the lawn 20, the boundary markers 805 are individually identifiable by adjacent scan match data performed by the emitter/receiver 151 (see FIG. 1B).

In scan matching, the robot lawnmower 10 can match scans taken at a given time while driving with scans stored in memory that are characteristic of each boundary marker 805, and the robot lawnmower 10 is thus able to determine its position relative to each of the individually identifiable boundary markers 805. In some implementations, the boundary markers 805 includes other individual identification means perceptible to the robot lawnmower 10, such as a bar code or encoded signal to enable the robot lawnmower 10 to determine its relative position.

As shown in FIG. 2A, boundary markers 805 (e.g., beacons) are placed around the perimeter of the lawn 20 to constrain or influence behavior of the robot lawnmower 10. A user places the boundary markers 805 at desired positions along the perimeter 21. In some examples, the boundary markers 805 are each within a line of sight of an adjacent boundary marker 805.

The boundary markers 805 may include a home marker that an operator can place in a position indicating a global origin (e.g., dock 12 or two boundary markers placed side by side). The operator distributes the boundary markers 805 as evenly as possible along the perimeter 21 of the lawn 20.

In some examples, beacons can be placed in the environment, and the robot can use the beacons to localize its position. The beacons can communicate using, e.g., Wide-Band (WB) or Ultra-wide Band (UWB) technology, 2.4 GHz (802.11v) technology, or other types of radio-frequency time of flight technology. These beacons can be placed inside the mowable area (e.g., beacon 810b), on the boundary (e.g., beacon 810a), or outside the boundary (e.g., beacon 810c). These beacons 810 (FIG. 2B) include transceivers 811 that communicate with each other as well as with a transceiver 11 located on the lawnmower robot 10.

Respective WB or UWB transceivers are placed on the robot lawnmower 10 (e.g., the robot lawnmower 10 includes a receiver/emitter 151 communicating with each of the beacons 810a-c), each of the beacons 810a-c, and optionally the dock 12. Several beacons 810a-c are placed about a mowable area and are spaced apart from each other and from the dock 12. As shown by the solid lines emanating from the robot lawnmower 10 in FIG. 2B, the robot lawnmower 10 communicates with each of the beacons 810a-c and the dock 12. Each beacon 810a-c communicates with each of the other beacons and the dock 12 as illustrated by the dashed lines.

If WB or UWB signals from WB or UWB beacons 810a-c positioned about a yard are to be used to determine the robot lawnmower's location within the yard, the location of the WB or UWB beacons 810a-c can be established by the robot lawnmower. In general, upon initial setup of a WB or UWB system, an initialization process is performed. The process can be based, in part, on a multidimensional scaling algorithm used to determine the location of the WB or UWB beacons 810a-c relative to one another, which in turn can be used to establish the location of the robot 10 relative to the beacons.

Thus, a human operator 500 is not required to place the WB or UWB beacons 810a-c at particular locations because the system automatically determines the locations of the WB or UWB beacons 810a-c upon initialization. In some implementations, the robot 10 determines the quantity of beacons deployed, e.g., by user input from the human operator 500. In those cases, the robot 10 can compare the quantity of beacons deployed with the number of beacons that are visible. If the number of beacons that are visible is fewer than the number of beacons deployed, the robot 10 can alert the human operator 500, and may suggest relocation, e.g., by identifying the beacons that are not visible by beacon identifier numbers.

This flexibility in positioning of the WB or UWB beacons 810a-c can provide the advantage of simplifying the installation and setup procedure for the autonomous lawn mowing robot system. Additionally, due to the omni-directional nature of the signal, the WB or UWB beacons 810a-c can be lower to the ground than in certain line-of-sight based systems because the robot 10 does not need to align (e.g., in a line-of-sight arrangement) with the beacon in order for a signal to be received from the beacon. The omni-directional nature of the signal also allows the beacons 810a-c to be placed off-plane and/or be rotated/tilted with respect to one another, the dock 12, and/or the robot 10.

In some examples, the beacons have a height of between about 12 inches and about 24 inches from the ground (e.g., between about 12 inches and about 24 inches; between about 16 inches and about 20 inches; about 18 inches). Upon subsequent use (e.g., prior to each time the robot lawnmower mows the lawn), a calibration or confirmation process can be performed to confirm that the WB or UWB beacons 810a-c are still in their expected, previously determined locations.

After collecting mapping data defining the perimeter 21, the human operator 500 may wish to confirm the location of the perimeter using a computing device 502, which can be a mobile device. The human operator 500 can launch a mapping application on the mobile device 502. The mobile device 502, in executing the mapping application, displays a map of the area to be mowed with the perimeter overlaid on the map for the human operator 500 to confirm.

To display the map, the mobile device 502 receives the mapping data from the robot 10. The mobile device 502 also receives first and second geographic coordinates for first and second reference points within the area. Then, the mobile device 502 aligns the mapping data to a coordinate system of a map image of the area using the first and second reference points. The mobile device 502 displays the map image of the area with an indicator of the perimeter overlaid on the map image based on the aligned mapping data. Example systems and methods for displaying the map are described further below with reference to FIG. 3 and FIG. 5.

Figure 3:
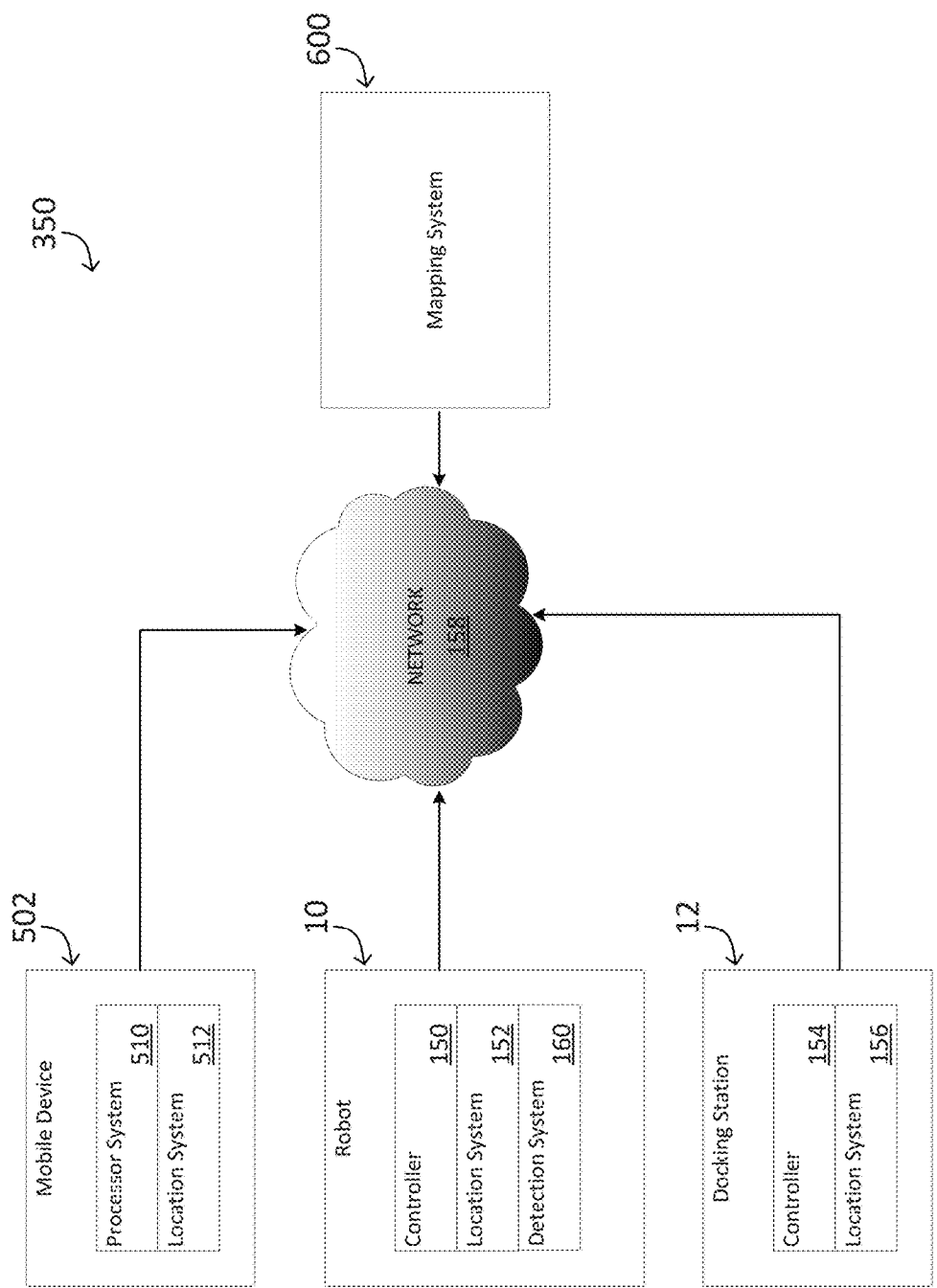
FIG. 3 is a block diagram of an example system 350 for displaying a map of an area to be mowed by a robot lawnmower 10.

FIG. 3 is a block diagram of an example system 350 for displaying a map of an area to be mowed by a robot lawnmower 10. The example system 350 includes the robot lawnmower 10, a mobile device 502, and a docking station 12. Those devices can communicate over a data communications network 158 with a mapping system 600 of one or more computers. The network 158 can include, e.g., a wireless router that communicates with the devices wirelessly and is connected to the Internet to communicate with the mapping system 600. In other examples, the robot 10 and docking station 12 can communicate with the mobile device and the mobile device can relay information to the mapping system.

The robot lawnmower 10 includes a controller 150, a detection system 160 configured to detect beacons, and an optional location system 152, e.g., a Global Positioning System (GPS) receiver. The mobile device 502 includes a processor system 510 and an optional location system 512, e.g., a GPS receiver. The docking station 12, in some implementations, can be a charging station that does not communicate on the network 158, and in some other implementations, can have a controller 154 and/or a location system 156, e.g., a GPS receiver.

In operation, the robot lawnmower 10 traverses an area to be mowed. To train the robot lawnmower 10, a human operator can push the robot lawnmower 10 around a perimeter of the area to be mowed, as described above with reference to FIGS. 1A-C. The robot controller 150, using the detection system, detects beacons while traversing the area and collects mapping data that specifies the perimeter of the area to be mowed.

After the robot lawnmower 10 collects the mapping data, the robot lawnmower 10 transmits the mapping data to the mobile device 502. For example, the robot lawnmower 10 can communicate with the mobile device 502 over a Bluetooth connection or over a local wireless network. The mobile device 502 can initiate the transmission by launching a mapping application executed by the processor system 510.

The mobile device 502 receives at least two reference geographic coordinates for reference points within the area. In some examples, the geographic coordinates include a latitude and a longitude. However, other geolocation data could be used. The reference points correspond to positions specified by the mapping data. The mobile device 502 can acquire the reference coordinates using any of various appropriate techniques. For purposes of illustration, consider the following three examples.

In a first example, suppose that the robot lawnmower 10 and the docking system 12 do not have or do not use location systems 152, 156. The mobile device 502 will use its location system 512 to acquire the reference coordinates. For example, the mobile device 502, in executing a mapping application, can instruct a human operator to move the mobile device 502 to the docking station 12, which can be a point specified in the mapping data by virtue of the robot lawnmower 10 starting at the docking station 12 while collecting the mapping data. When at the docking station 12, the human operator provides input to the mobile device 502 indicating that the mobile device 502 is at the docking station, and the mobile device 502 uses its location system 512 to obtain a first geographic reference coordinate.

Then, the mobile device 502 instructs the human operator to move the mobile device 502 to another point in the area that is specified in the mapping data. For example, the mobile device 502 can instruct the human operator to move the mobile device 502 to the closest beacon or to another beacon, or the mobile device 502 can instruct the human operator to walk a certain distance along the path taken while the robot lawnmower 10 was collecting the mapping data. When the human operator reaches the second point, the mobile device 502 uses its location system 512 to obtain the second geographic reference coordinate.

In a second example, suppose that the robot lawnmower 10 does have a location system 152. The robot lawnmower 10, while collecting the mapping data, can also obtain the reference coordinates. For example, when the robot lawnmower 10 starts collecting the mapping data at the location of the docking station 12, the robot lawnmower 10 uses the location system 152 to obtain the first geographic reference coordinates (e.g., latitude and longitude coordinates). Then, after the robot lawnmower 10 moves to another location in the area that is at least a certain distance from the docking station 12, the robot lawnmower 10 uses the location system 152 to obtain additional geographic reference coordinates. This process can be repeated to obtain any number of additional geographic reference coordinates. The robot lawnmower 10 sends the mapping data and the geographic reference coordinates to the mobile device 502. In some cases, e.g., where the location of the reference points is not already specified, the robot lawnmower 10 can send data specifying how the geographic reference coordinates correspond to the mapping data.

In a third example, suppose that the docking station 12 has and uses a location system 156. The docking station 12 can supply the first geographic reference coordinates (e.g., latitude and longitude coordinates), and robot lawnmower 10 or the mobile device 502 can obtain the second geographic reference coordinates at a point at least a certain distance away from the docking station 12 within the area. It may be useful to have a location system 156 in the docking station 12 instead of the robot lawnmower 10, e.g., to reduce the weight of the robot lawnmower 10.

The mobile device 502 uses the geographic reference coordinates and the mapping data to display a map image of the area to be mowed. In some implementations, the mobile device 502 obtains a map image from the mapping system 600, orients the mapping data to a coordinate system of the map image from the mapping system 600, and then displays the map image with a graphic overlay of the perimeter of the area to be mowed. In some other implementations, the mobile device 502 sends the mapping data and the geographic reference coordinates to the mapping system 600, and the mapping system 600 generates a map image with a graphic overlay of the perimeter of the area to be mowed. In one particular example, the first geographic reference coordinate is used to identify a common location between the map image and the boundary and the second geographic reference is used to rotationally align the map image with the mapping data.

FIGS. 4A-4K depict example map images and mapping data to illustrate the use of the system 350 of FIG. 3.

Figures 4A, 4B:
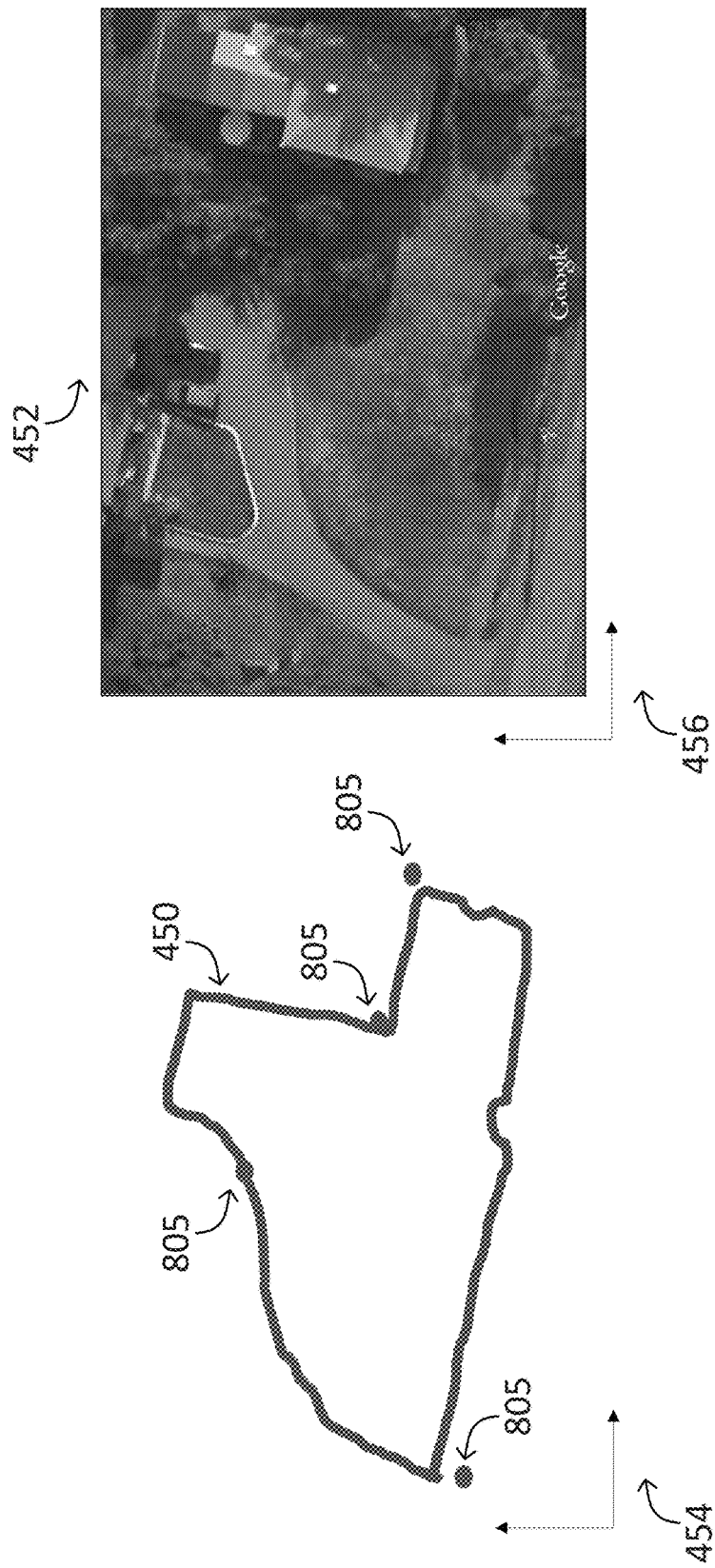
FIGS. 4A-4K depict example map images and mapping data to illustrate the use of the system 350 of FIG. 3.

FIG. 4A depicts an example perimeter 450 of an area to be mowed. The perimeter 450 can be stored in any appropriate data structure, e.g., as a series of X,Y coordinates referenced in a coordinate system 454. The coordinates can be distances (e.g., X and Y distances) from a starting point, e.g., a docking station 12, of the robot lawnmower 10 when it was collecting mapping data. The mapping data can include the location of beacons 805 which can be illustrated with dots or other symbols. FIG. 4I illustrates the perimeter 450 as a Cartesian grid of cells that are marked as being inside, outside, or on the boundary of the mowable region.

FIG. 4B depicts an example map image 452 of an area to be mowed. A mobile device 502 can obtain the map image 452 from a mapping system 600. The mapping system 600 may store map images or obtain map images from another system. To obtain the appropriate map image 452, the mobile device 502 provides location data to the mapping system 600. For example, the mobile device 502 can send GPS coordinates to the mapping system, or the mobile device 502 can prompt a human operator 500 to enter an address. The map image 452 is displayed with reference to a coordinate system 456.

Figure 4C:
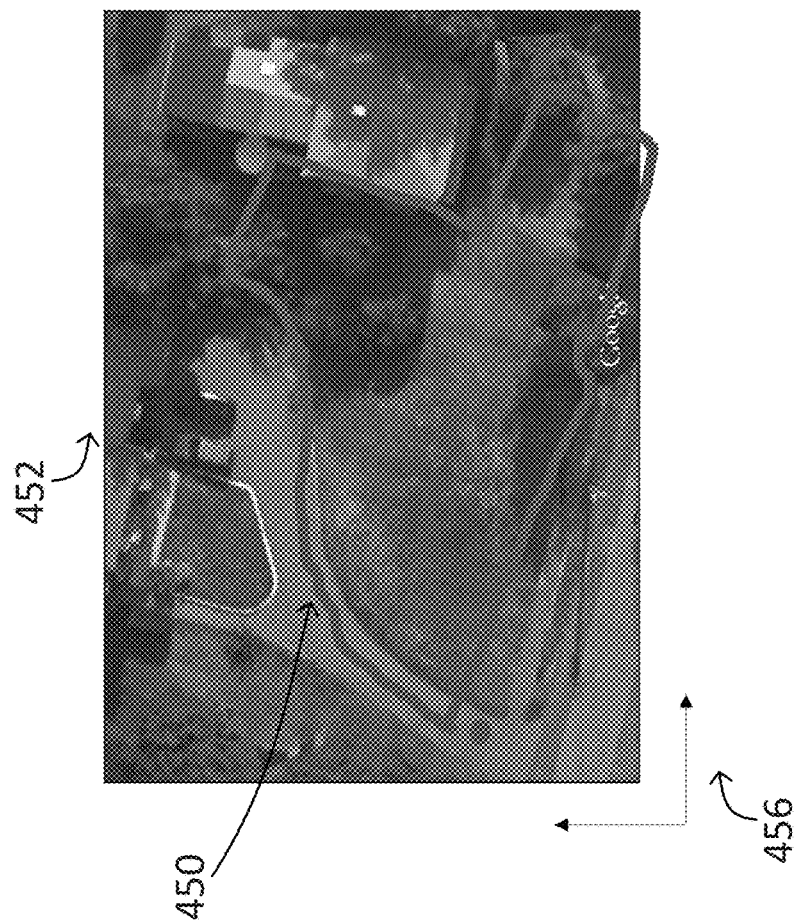

FIG. 4C depicts the map image 452 with the perimeter 450 overlaid on top of the map image 452. The perimeter 450 has not been adjusted to account for the different coordinate system 456. Consequently, the perimeter 450 does not accurately depict the boundary of the area to be mowed with respect to the map image 452.

Figure 4D:
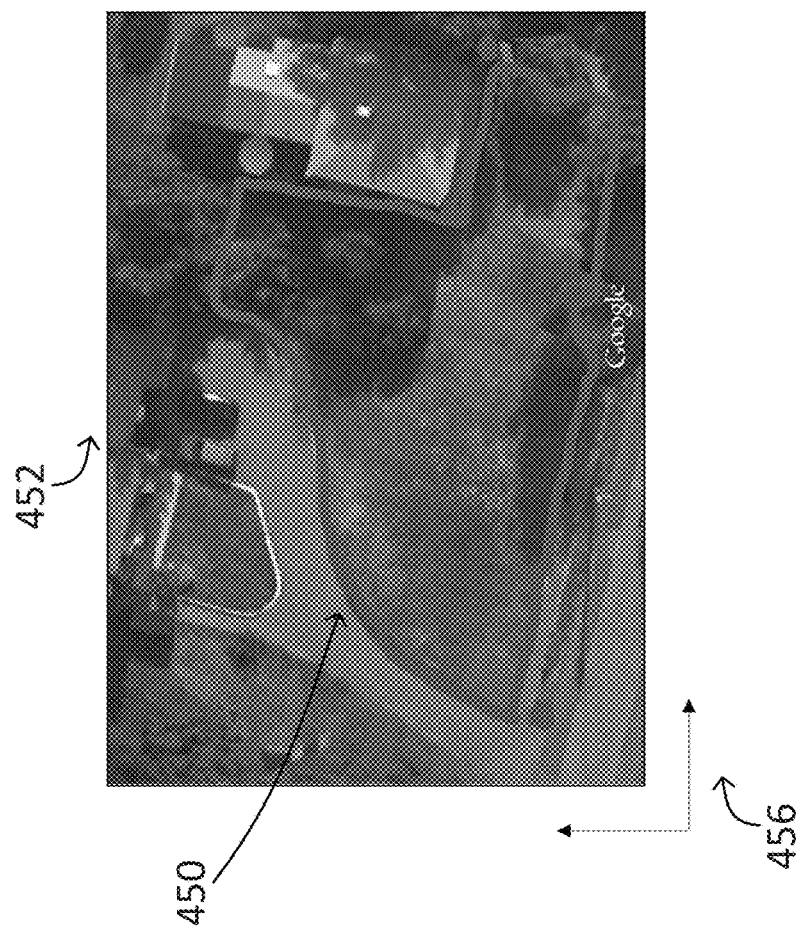

FIG. 4D depicts the map image 452 with the perimeter 450 overlaid after the mapping data has been adjusted to account for the different coordinate systems 454, 456. The mobile device 502 and/or the mapping system 600 can adjust the mapping data by shifting, rotating, and/or scaling the mapping data so that the mapping data is aligned to the coordinate system of the map image 452. When aligned, the geographic coordinates of the reference points within the mapping data will match with geographic coordinates for the map image.

In adjusting the mapping data, the perimeter path 450 is translated to the same coordinate frame as the map image 452. The difference between the first reference point location in the robot coordinate system 454 and the first reference point location in the image coordinate system 456 is calculated. All data within the robot coordinate system 454, including beacon locations 805 and the perimeter path 450, can be shifted by that difference, resulting in translated data. The first reference point in the image coordinate system can be used as the vertex to calculate the angle between the second reference point from the translated robot coordinate system 454 and the second reference point from the image coordinate system 456. This angle can used to rotate all data in the translated data in the image coordinate system.

Figure 4E:
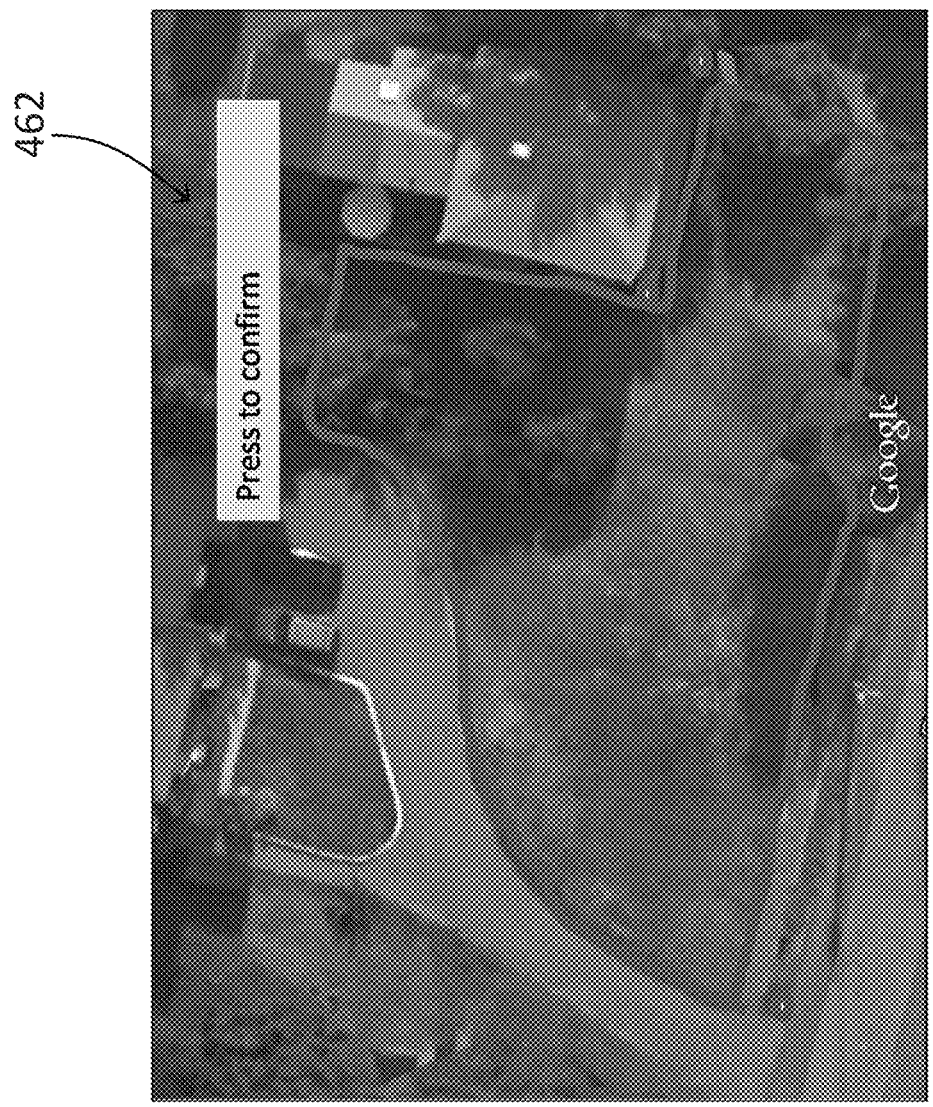

FIG. 4E depicts an example screenshot of the displayed map image 460 with a user interface element 462 requesting a user to confirm the location of the boundary on the map image. The user can inspect the map image 460 to confirm that the perimeter 450 was correctly captured by the robot lawnmower 10 and/or that the perimeter 450 has been correctly aligned to the map image 460. Because the map image 460 is for user perception of the boundary and mowing location/progress and is not used to control or identify the boundary for the robot lawnmower 10, it is not necessary for the alignment to be exact. More particularly, the robot determines its location relative to the trained boundary using the coordinate system defined during the training process.

Figure 4F:
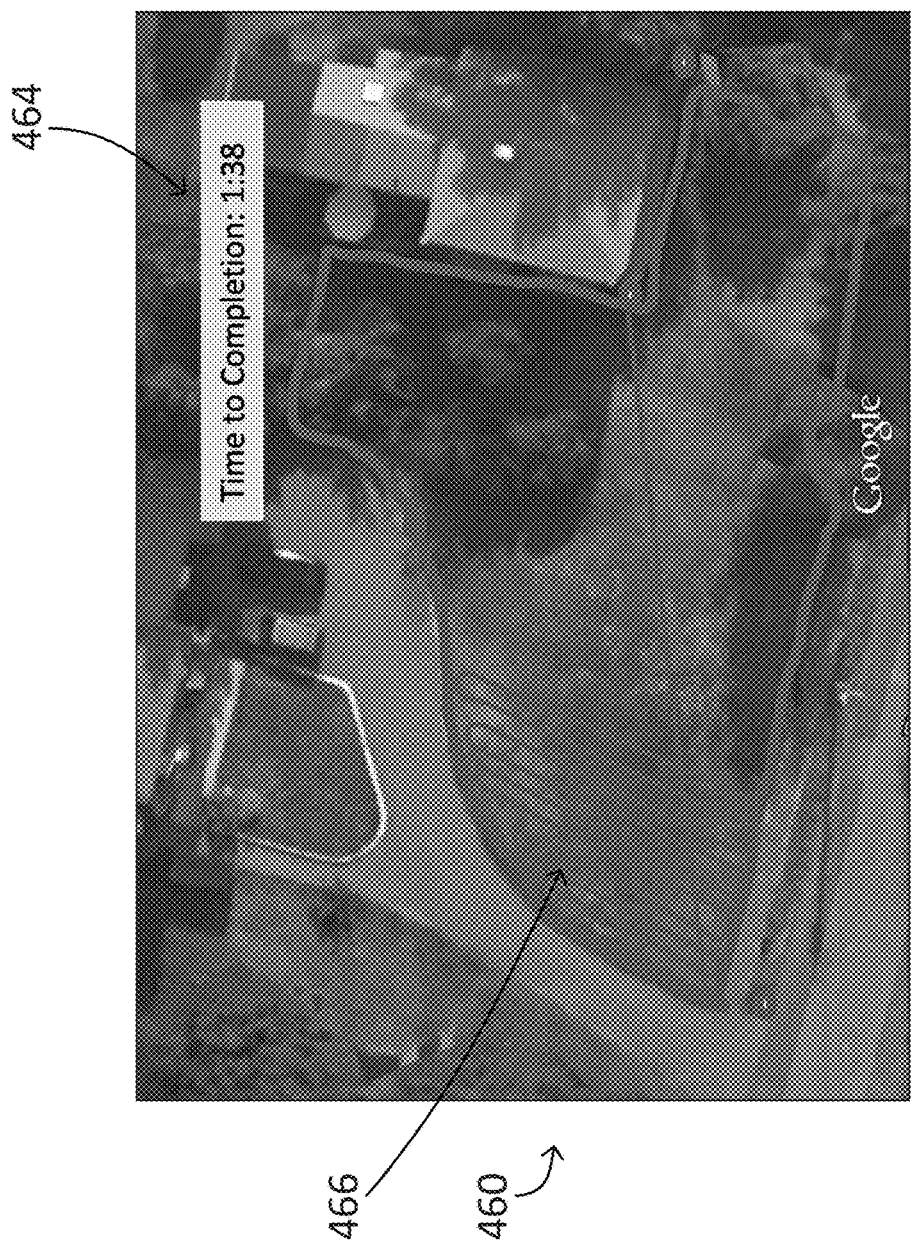

FIG. 4F depicts an example screenshot of the displayed map image 460 with a graphic overlay 466 showing the progress of the robot lawnmower 10 as it mows the lawn. More particularly, the robot sends information about its location during mowing to the mobile device and the mobile device 502 updates the map with the graphic overlay showing the path traversed by the robot 10. The map image 460 also includes a user interface element 464 depicting an estimated time to completion. The time to completion can be estimated based on, e.g., the area remaining to be mowed within the perimeter 450 of the area to be mowed. The user interface element 464 can be any appropriate user interface element.

Figure 4G:

FIG. 4G depicts an example screenshot of the displayed map image 460 with a graphic overlay 468 showing a graphic overlay 466 showing the progress of the robot lawnmower 10 and a projected remaining path of the robot lawnmower 10 as it mows the lawn. This allows the user to visualize both the portion of the yard that has been mowed and a path the root lawnmower 10 will follow to complete mowing of the yard. The projected path can be projected, e.g., based on the shape of the perimeter 450 and the current progress of the robot lawnmower 10. Projecting the remaining path of the robot lawnmower 10 is described in further detail below with reference to FIG. 6. In some examples, the robot lawnmower 10 can encounter unexpected obstacles during the mowing process. For example, a tree limb could block the robot lawnmower 10 from mowing a particular location or area of the yard. In some examples, when the robot lawnmower 10 encounters an unexpected obstacle, an indicator (not shown) can be provided on the display at the location where the unexpected obstacle was encountered. This can provide an indication to the user (e.g., the homeowner) that he/she should remove an obstacle from the yard to allow the robot lawnmower 10 to traverse the area and mow the area during its next scheduled mowing time.

Figure 4H:
Figure 4I:
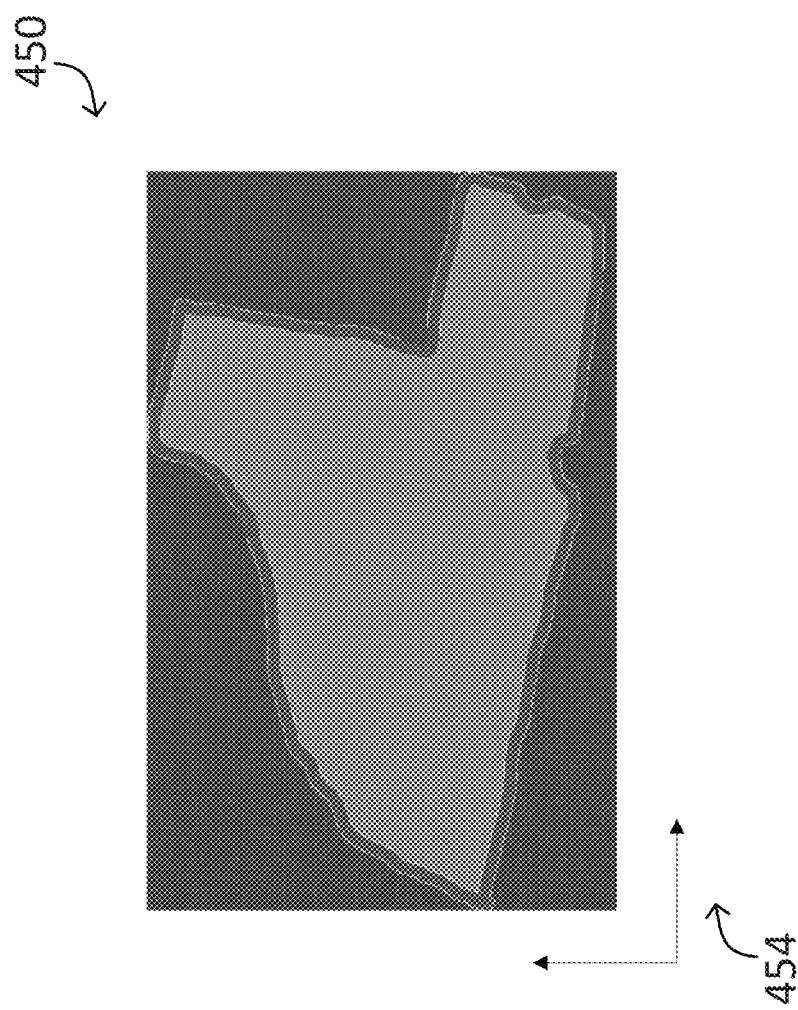

FIG. 4H depicts an example screenshot of the displayed map image 460 with a suggested location 470 of a beacon. The suggested location 470 can be an alternative to an existing location of a beacon. Because users may choose their own beacon locations, it can be useful to provide suggested locations for beacons with reference to a map image 460 to help show users where beacon placement may improve performance factors (e.g., accuracy, efficiency) of the robot lawnmower 10. Determining suggested beacon locations is described in further detail below with reference to FIG. 7.

Figure 5:
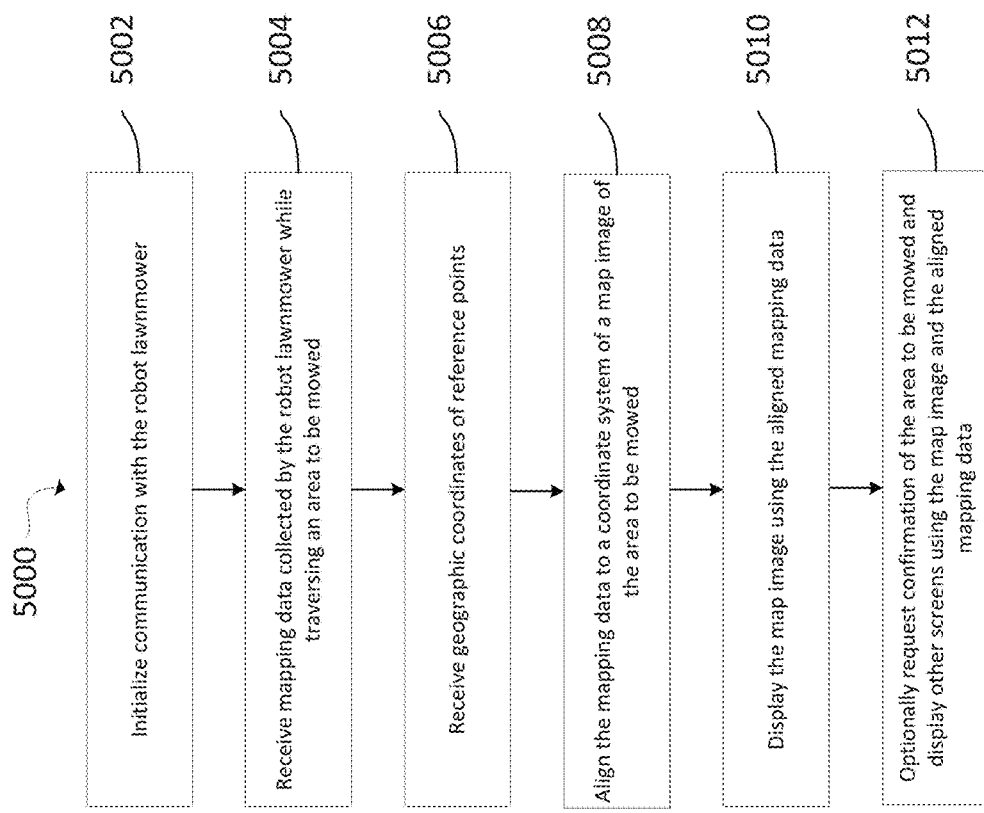
FIG. 5 is a flow diagram of an example method 5000 performed by a computing device, e.g., mobile device 502, for displaying a map image of an area to be mowed.

FIG. 5 is a flow diagram of an example method 5000 performed by a computing device, e.g., mobile device 502, for displaying a map image of an area to be mowed. For purposes of illustration, the method 5000 will be described as being performed by the mobile device 502 of FIG. 3. The mobile device 502 can perform the method, for example, to produce the screen shots of FIGS. 4D-4H. The mobile device 502 can begin performing the method 5000 when a user launches a mapping application on the mobile device 502.

The mobile device 502 initializes communication with the robot lawnmower 10 (5002). For example, the mobile device 502 can establish a Bluetooth connection with the robot lawnmower 10, or the mobile device 502 can connect with the robot lawnmower 10 over a wireless network. In some implementations, the mobile device 502 prompts a user for information to correctly identify the robot lawnmower 10; in some other implementations, the mobile device 502 is configured to wirelessly probe for the robot lawnmower 10. In some implementations, the controller 150 of the robot lawnmower 10 authenticates to the mobile device 502.

If the robot lawnmower 10 has not yet traversed the lawn to collect mapping data, the mobile device 502 can prompt the user to cause the robot lawnmower 10 to collect the mapping data. For example, the mobile device 502 can display instructions for the user to interact with robot lawnmower 10, and the mobile device 502 can place a phone call to a customer service department if the user desires to get help from a person. In some implementations, the user pushes the robot lawnmower 10 about the yard, e.g., as described above with reference to FIGS. 1A-C.

The mobile device 502 receives the mapping data from the robot lawnmower 10 (5004). The mapping data can define a perimeter of the area to be mowed and other data, e.g., locations of beacons placed about the area to be mowed. The mapping data can be stored in any appropriate data structure, e.g., as a list of coordinates with respect to a starting point, or as vector data.

The mobile device 502 receives geographic coordinates of reference points within the area (5006). For example, the mobile device 502 can receive the geographic coordinates of reference points as described above with reference to FIG. 3. The mobile device 502 receives geographic coordinates for at least two reference points. The reference points can be, e.g., the location of a docking station 12 and a nearest beacon 850 or other point at least a certain distance away from the docking station 12.

The mobile device 502 receives a map image of the area to be mowed (5007). For example, the mobile device 502 can use one of the reference points (e.g., the latitude and longitude) to retrieve the map image from a database of map images. In another example, the mobile device can request that the user enter an address and use the address to retrieve the map image from the database of map images. The received map image can be an overhead photograph of the lawn and surrounding image such as a satellite image.

The mobile device 502 aligns the mapping data to a coordinate system of a map image of the area to be mowed (5008). For example, the mobile device 502 can obtain the map image and data associated with the map image that specifies a correspondence between portions of the map image and geographic coordinates. The mobile device can then align the mapping by data by shifting, rotating, and/or scaling the mapping data so that the first and second reference points match first and second locations on the map image as specified by the data specifying the correspondence between portions of the map image and geographic coordinates.

In the case where there is insufficient information (e.g., one of the reference points is missing or believed to be noisy or incorrect) the mobile device 502 and/or the mapping system can search for features in the map that correspond with the perimeter 450. Image classifiers can be used on the map image 452 to find commonly traced features, such as the corner of a house or building, the edge of a lawn, or any other distinct path that matches well with the perimeter 450. The mobile device 502 can also incorporate other sources of information with the same geodetic coordinate system as the map image 452, such as public boundary and property lines.

In implementations where the robot 10 includes a magnetometer 315, the robot 10 can include directional data with the mapping data. The mobile device 502 and/or the mapping system can then use the directional data, e.g., instead of one of the reference points or in addition to the two reference points to improve the alignment. For example, the robot 10 can include, with the mapping data, data indicating which direction is north. The mapping system can also then determine which direction, for the map image, faces north, and the mobile device 502 and/or the mapping system can align the mapping data and/or the map image so that the two directions match.

In some implementations, image registration techniques from computer vision are used to align the map data with the map image. The map is converted to a grid representation (if it is not already in that format), where each cell is marked as either inside or outside the mowable region, and each cell value can be represented by a pixel with a different intensity. For example, mowable cells can be marked by white pixels and non-mowable cells can be marked by black pixels. The map image is also processed by an algorithm that converts colors to intensities based on the probability that each color corresponds to a mowable region. For example, green pixels may be converted to white pixels (high likelihood of being mowable), yellow and brown pixels may be converted to gray pixels (medium likelihood of being mowable), and pixels of other colors may be converted to black pixels (low likelihood of being mowable).

Figure 4K:
Figure 4J:
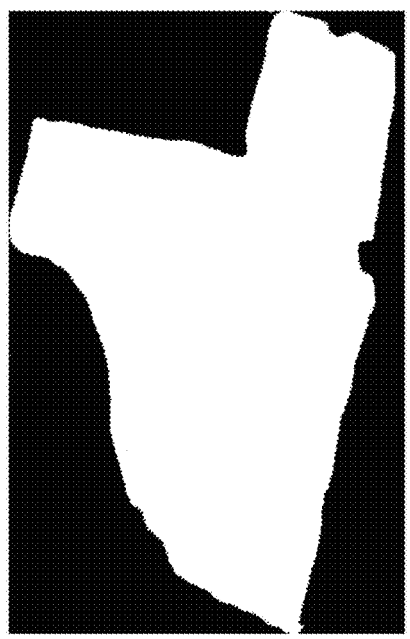

In some implementations, a machine learning algorithm (e.g. support vector machine, neural network) can be used to learn which colors of the map image are most likely to represent mowable areas based on example images. The machine learning algorithm can then be used with the map image to create two grass probability images (GPIs), one for the mowable area and one for the map image, can then be aligned using standard image registration techniques. FIG. 4J illustrates an example grass probability image 480 for the mowable area. FIG. 4K illustrates an example grass probability image 482 for the map image.

These techniques can include intensity-based algorithms and feature-based algorithms. In both approaches, the geo-referenced points measured using, e.g., GPS (on the robot 10, dock 12, or mobile device 502) can be used as an initial guess of the alignment between the map GPI and the map image GPI. In an intensity-based approach, the map GPI is then transformed (using translation and rotation) and correlated with the map image GPI, and the transformation with the highest correlation value is used to align the images. The search of transformation space can either be exhaustive in a limited region near the initial guess, or non-linear optimization techniques such as hill climbing, gradient descent, or simulated annealing can be used to reduce the time required for alignment.

In a feature-based approach, local features are detected in the map GPI and the map image GPI. These features can include lines and corners, as well as scale-invariant features such as SIFT (Scale-Invariant Feature Transform), SURF (Speeded Up Robust Features), or HOG (Histogram of Oriented Gradients). Once the locations of these features are detected in both GPIs, the feature locations in the map GPI can be transformed and matched with those in the map image GPI using the same techniques as described above for intensity-based approaches. The best transformation is then used for the map alignment.

In some implementations, the mobile device 502 receives the map image from a mapping system 600 and aligns the mapping data to the map image. In some other implementations, the mobile device 502 supplies the mapping data and geographic coordinates for the reference points to the mapping system 600, and the mapping system aligns the mapping data and supplies a map image using the aligned mapping data. The mapping system can select the map image in any appropriate way, e.g., using the geographic coordinates for the reference points, or by using the user's street address.

The mobile device 502 displays the map image using the aligned mapping data (5010). For example, the mobile device 502 can display the map image with a graphic overlay illustrating a perimeter of the area to be mowed. In another example, the mobile device 502 can display the map image with the area to be mowed highlighted or shaded.

Once the mapping data has been aligned to the coordinate system of the map image, the map image and the mapping data can be used for various optional tasks (5012). For example, the mobile device 502 can prompt the user to confirm the area to be mowed. The mobile device 502 can present a display that shows the progress of the robot lawnmower 10 in real-time or near real-time while it is mowing the lawn, e.g., by having the robot lawnmower 10 communicate its position to the mobile device 502 while it mows the lawn. The mobile device 502 can present a display that shows the projected remaining path of the robot lawnmower 10 and/or the projected time remaining for the robot lawnmower 10 to complete mowing the lawn.

FIG. 6 is a flow chart of an example method 6000 for projecting the remaining path of a robot lawnmower 10. The method 6000 is performed by a computing device, e.g., the mobile device 502 of FIG. 3. For purposes of illustration, the method 6000 will be described as being performed by the mobile device 502 of FIG. 3.

The mobile device 502 receives mapping data defining a perimeter around the area to be mowed (6002). The mobile device 502 receives tracking data specifying a portion of the area that the robot lawnmower 10 has already mowed (6004).

The mobile device 502 plots a projected path for the robot lawnmower 10 from the robot lawnmower's current location that could be followed by the robot lawnmower 10 to finish mowing the area inside of the perimeter that has not been mowed (6006). In some implementations, the mobile device 502 plots the projected path by simulating a navigational algorithm stored on the controller 150 of the robot lawnmower 10.

In some implementations, the controller generates a coverage path based on a Boustrephedon (e.g., cornrow) algorithm applied to a grid map representation of the lawn. In this grid map, cells are marked as being inside, outside, or on the boundary of the mowable area. In some cases, the robot may start at one corner of the lawn (as in the example in FIG. 4F), and then move parallel to the lawn edge until it encounters a lawn boundary cell. At this point the robot makes a 180 degree turn and then mows down a new path that is parallel to the first row, and offset laterally by no more than the width of the cutting mechanism (to insure that there is no gap between the cut grass in each row).

The user could also select the orientation of these ranks (vertical, horizontal, or an arbitrary angle as preferred by them). The user can also block off an area of the lawn that they would like the robot lawnmower to not cover during its current mission or designate an area that should be more thoroughly mowed (by way of slower movement or multiple passes). In some implementations, the boundary of this "keep-out" zone are marked in the grid map as boundary cells, while the cells inside the keep-out zone are marked as non-mowable. Paths can have other configurable metrics that allows the user to select between different mow patterns or styles or can have pseudo-random attributes that allow for varying paths to be generated.

The mobile device 502 generates a map image of the area to be mowed with a graphic overlay of the projected path (6008). The mobile device can align the mapping data and the tracking data to a coordinate system of a map image, e.g., as described further above with reference to FIG. 5. The mobile device can include various features in the map image, e.g., a first graphic overlay showing the area that the robot lawnmower 10 has already mowed and a second graphic overlay showing the projected path and an indicator of a projected time to completion. The projected time to completion can be based on, e.g., the size of the area remaining to be mowed and a speed of the robot lawnmower 10 and the amount of overlap between the rows/ranks. The time remaining may also be based on the amount of battery that the robot lawnmower 10 has left and can be calculated by the amount of energy left in the battery and/or the amount of energy left in the battery less the energy required to get the robot lawnmower 10 back to the docking station 12 divided by the average power consumption. The total time remaining to mow the lawn can also be displayed, including the time required to return to the charger, recharge, and then mow the remaining area.

FIG. 7 is a flow chart of an example method 7000 for determining suggested beacon locations. The method 7000 is performed by a computing device, e.g., the mapping system 600 of FIG. 3. For purposes of illustration, the method 7000 will be described as being performed by the mapping system 600 of FIG. 3.

The mapping system 600 receives mapping data defining a perimeter of an area to be mowed (7002). The mapping data also specifies the locations of several navigation beacons. The mapping system 600 receives the mapping data from the robot lawnmower 10. For example, the robot lawnmower 10 can provide the mapping data to the mobile device 502, which can then provide the mapping data to the mapping system 600, e.g., at the request of a user.

The mapping system 600 checks each beacon location for a possible suggested location (7004). For example, the mapping system can determine, for each beacon, the distance to the two nearest beacons. If the beacon is closer to one of the nearest beacons than the other, the mapping system can determine a suggested location that is closer to a mid-point between the two beacons along the perimeter. In another example, the mapping system can use elevation data to determine that two neighboring beacons are at two different elevations with a height distance that exceeds a threshold. The mapping system can determine a suggested location that is at an elevation between the two different elevations.

The robot lawnmower 10 can identify places where position estimates from the localization system are less confident. The mapping system can suggest placing a beacon near these places of lower confidence. Suggested locations can also be based on the beacon location map by analyzing long gaps in distance between beacons or beacons that are only able to communicate with a couple beacons because of occlusions.

The mapping system 600 provides any suggested beacon locations for display on a map image (7006). For example, the mapping system 600 can generate a map image, by aligning the mapping data to a map image, with graphic indicators of the current beacon locations and the suggested beacon locations. In another example, the mapping system 600 provides the suggested locations to a mobile device 502, and the mobile device 502 generates a map image showing the suggested beacon locations.

While this specification contains many specific details, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Accordingly, other embodiments are within the scope of the following claims.

What is claimed is:

1. A method comprising:
presenting, on a display, a graphical representation of a map including a representation of an area mowable by an autonomous robot lawnmower and a representation of a perimeter along a boundary of the mowable area;
presenting, on the display, an indicator representing a location of a docking station to which the autonomous robot lawnmower is dockable;
presenting, on the display, a graphical representation of a projected path to be followed by the autonomous robot lawnmower during an autonomous mowing operation performed by the autonomous robot lawnmower on the mowable area;
updating the graphical representation of the projected path presented on the display as the autonomous robot lawnmower performs the autonomous mowing operation on the mowable area; and
indicating, on the display, an autonomous mowing operation completion time estimated from an amount of energy remaining on a battery of the autonomous robot lawnmower and an amount of energy of the battery for moving the autonomous robot lawnmower to the docking station.

2. The method of claim 1, wherein the perimeter corresponds to a perimeter path traversed by the autonomous robot lawnmower.

3. The method of claim 2, further comprising presenting a graphical representation of an instruction for moving the autonomous robot lawnmower a predefined distance along the boundary of the mowable area during a teaching operation in which the autonomous robot lawnmower is moved along the perimeter path while collecting data representing the perimeter path.

4. The method of claim 3, further comprising:
providing an alert indicative of an unteachable state of the autonomous robot lawnmower during the teaching operation; and
presenting a graphical representation of an instruction to steer the autonomous robot lawnmower in response to the unteachable state.

5. The method of claim 2, wherein presenting the graphical representation of the map comprises aligning a coordinate system of the perimeter path and a coordinate system of the map.

6. The method of claim 1, wherein presenting the graphical representation of the map comprises overlaying the representation of the perimeter on the representation of the mowable area based on data collected by the autonomous robot lawnmower during traversal of the perimeter.

7. The method of claim 1, wherein presenting the graphical representation of the projected path comprises:
presenting a graphical representation of a path traversed by the autonomous robot lawnmower during the autonomous mowing operation; and
presenting a graphical representation of a remaining path to be traversed by the autonomous robot lawnmower during the autonomous mowing operation.

8. The method of claim 1, further comprising presenting, on the display, a plurality of indicators representing locations of beacons detectable by the autonomous robot lawnmower to localize a position of the autonomous robot lawnmower on the mowable area.

9. The method of claim 1, wherein presenting the graphical representation of the map of the mowable area comprises:
indicating a non-mowable region on the map corresponding to a region external to the boundary of the mowable area; and
indicating a mowable region on the map within the boundary of the mowable area.

10. The method of claim 9, further comprising analyzing the map to classify map features for determining the boundary of the mowable region.

11. The method of claim 1, further comprising causing transmission of a user-selected parameter defining a path to be followed by the autonomous robot lawnmower during the autonomous mowing operation, the user-selected parameter being at least one of a path orientation, a path pattern, or a region to be excluded from the autonomous mowing operation.

12. The method of claim 1, further comprising presenting a graphical representation of an instruction to move the display to a location of the docking station or a beacon, the display being included in a mobile computing device configured to wirelessly communicate with the autonomous robot lawnmower.

13. The method of claim 1, further comprising collecting a geographic reference coordinate using a global positioning system receiver of a mobile computing device configured to wirelessly communicate with the autonomous robot lawnmower,
wherein presenting the indicator comprises presenting the indicator on the display of the mobile computing device based on the geographic reference coordinate.

14. The method of claim 13, wherein the geographic reference coordinate corresponds to a location of a beacon or the location of the docking station, the beacon detectable by the autonomous robot lawnmower for localizing a position of the autonomous robot lawnmower on the mowable area.

15. The method of claim 1, further comprising receiving data representing the map from a remotely located server.

16. The method of claim 1, further comprising:
presenting a prompt for a user to enter an address corresponding to a location of the mowable area, and
causing data representing the map to be retrieved based on the entered address.

17. The method of claim 1, wherein the graphical representation of the map is a satellite map image.

18. The method of claim 1, further comprising presenting, on the display, a graphical representation of an instruction to indicate a suggested location proximate the mowable area to place a beacon detectable by the autonomous robot lawnmower for localizing a position of the autonomous robot lawnmower.

19. The method of claim 1, wherein the autonomous mowing operation completion time is further estimated from a remaining area to be mowed of the mowable area.

20. The method of claim 1, wherein the autonomous mowing operation completion time is further estimated from a speed of the autonomous robot lawnmower.

21. The method of claim 1, wherein the autonomous mowing operation completion time is further estimated from an amount of overlap between rows travelled by the autonomous robot lawnmower during the autonomous mowing operation.

22. The method of claim 1, wherein the autonomous mowing operation completion time is further estimated from a total amount of time required to return to the docking station, recharge the battery of the autonomous robot lawnmower, and mow a remaining area to be mowed of the mowable area.

23. The method of claim 1, further comprising presenting, on the display, an indicator representing a location of a beacon detectable by the autonomous robot lawnmower for localizing a position of the autonomous robot lawnmower on the mowable area.

* * * * *